United States Patent
Miyahara et al.

(10) Patent No.: US 6,538,694 B1
(45) Date of Patent: Mar. 25, 2003

(54) IMAGE PICKUP APPARATUS EQUIPPED WITH COMPATIBLE-WITH-ZOOMING TYPE CONTOUR COMPENSATION CIRCUIT, COMPATIBLE-WITH-IMAGE-PICKUP-CONDITIONS TYPE IMAGE OUTPUT CIRCUIT, AND COMPATIBLE-WITH-ALL-PIXEL-READOUT-SYSTEM-SOLID-IMAGE-PICKUP-ELEMENT TYPE ELECTRONIC ZOOM CIRCUIT

(75) Inventors: Hiroyuki Miyahara, Kanagawa-ken (JP); Kenji Taguchi, Kanagawa-ken (JP)

(73) Assignee: Victor Company of Japan, Limited, Kanagawa-ken (JP)

( * ) Notice: Subject to any disclaimer, the term of this patent is extended or adjusted under 35 U.S.C. 154(b) by 0 days.

(21) Appl. No.: 09/204,659

(22) Filed: Dec. 2, 1998

(30) Foreign Application Priority Data

Dec. 4, 1997 (JP) ............................. 9-334614
Dec. 4, 1997 (JP) ............................. 9-334619
Dec. 4, 1997 (JP) ............................. 9-350099

(51) Int. Cl.$^7$ ................... H04N 5/217; H04N 9/68; H04N 5/335; H04N 11/20
(52) U.S. Cl. .............. 348/241; 348/222.1; 348/234; 348/238; 348/305; 348/446
(58) Field of Search .................. 348/234, 238, 348/241, 235, 236, 237, 305, 239, 446, 448

(56) References Cited

U.S. PATENT DOCUMENTS

| | | | |
|---|---|---|---|
| 5,083,208 A | 1/1992 | Hatanaka | 358/227 |
| 5,253,064 A | * 10/1993 | Yamamoto et al. | 348/240.2 |
| 5,374,995 A | 12/1994 | Loveridge et al. | 358/447 |
| 5,412,423 A | * 5/1995 | Ohashi | 348/234 |
| 5,475,426 A | * 12/1995 | Kinugasa et al. | 348/240.2 |

(List continued on next page.)

FOREIGN PATENT DOCUMENTS

| | | |
|---|---|---|
| EP | 0 608 092 A2 | 7/1994 |
| EP | 0 610 701 A1 | 8/1994 |
| EP | 0 618 739 A2 | 10/1994 |
| JP | 05122577 | 9/1993 |

OTHER PUBLICATIONS

English Translated Abstact for Japanese Patent No. JP05122577.

*Primary Examiner*—Wendy R. Garber
*Assistant Examiner*—John M. Villecco
(74) *Attorney, Agent, or Firm*—Gary M. Nath; Harold L. Novick; Marvin C. Berkowitz

(57) ABSTRACT

A frame/field converter circuit addition-processes image data constituting respective fields in a ratio corresponding to an image pickup mode or the like and outputs the resulting image data. As a result of this, it is possible to perform addition processing on image data constituting respective fields in an optimum ratio corresponding to an image pickup mode or the like and output the resulting image data. This makes it possible to improve the frequency characteristic and S/N ratio of the image and thereby enhance the quality of the displayed image. A contour compensation circuit performs contour compensation processing with respect to the frequency band of the image data in correspondence with the zoom magnification. As a result of this, it is possible to mitigate the level of the return noises generated in correspondence with the zoom magnification and thereby prevent the deterioration of the frequency characteristic and S/N ratio of the image to thereby enhance the quality of the image. An electronic zoom circuit performs zoom processing according to both of even-line data and odd-line data output from an all-pixel readout system solid image pickup element.

19 Claims, 14 Drawing Sheets

U.S. PATENT DOCUMENTS

| | | | | |
|---|---|---|---|---|
| 5,583,568 A | * | 12/1996 | Suga et al. | 348/234 |
| 5,666,160 A | * | 9/1997 | Hwang | 348/240.2 |
| 5,671,013 A | * | 9/1997 | Nakao | 348/234 |
| 5,838,371 A | | 11/1998 | Hirose et al. | 348/240 |
| 5,963,262 A | * | 10/1999 | Ke et al. | 348/447 |
| 5,978,023 A | * | 11/1999 | Glenn | 348/234 |
| 6,064,437 A | * | 5/2000 | Phan et al. | 348/446 |
| 6,067,120 A | * | 5/2000 | Horikawa et al. | 348/447 |
| 6,078,357 A | * | 6/2000 | Yamamoto et al. | 348/234 |
| 6,266,093 B1 | * | 7/2001 | Glenn | 348/448 |
| 6,266,101 B1 | * | 7/2001 | Suto | 348/663 |
| 6,281,933 B1 | * | 8/2001 | Ritter | 348/447 |

* cited by examiner

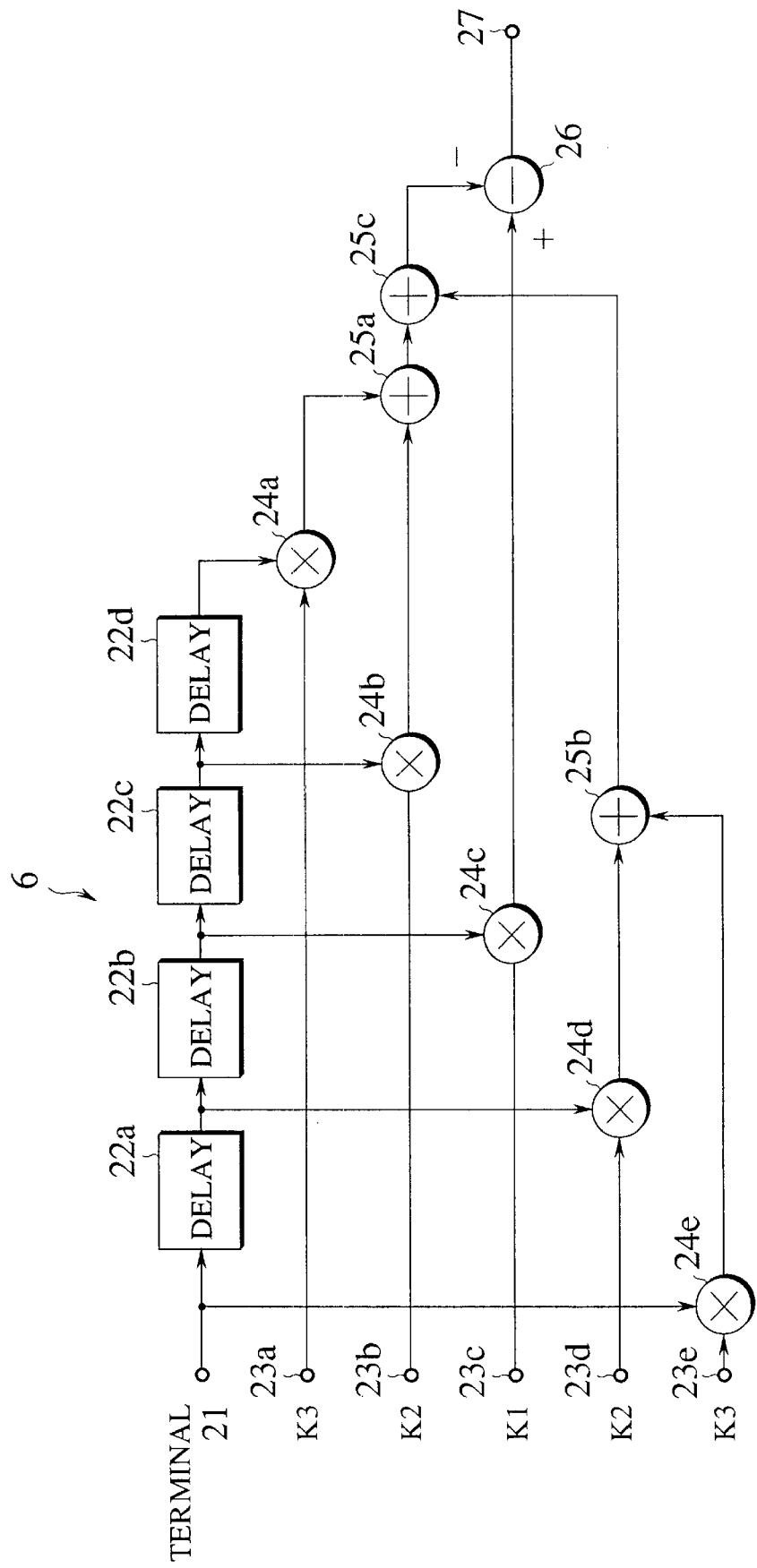

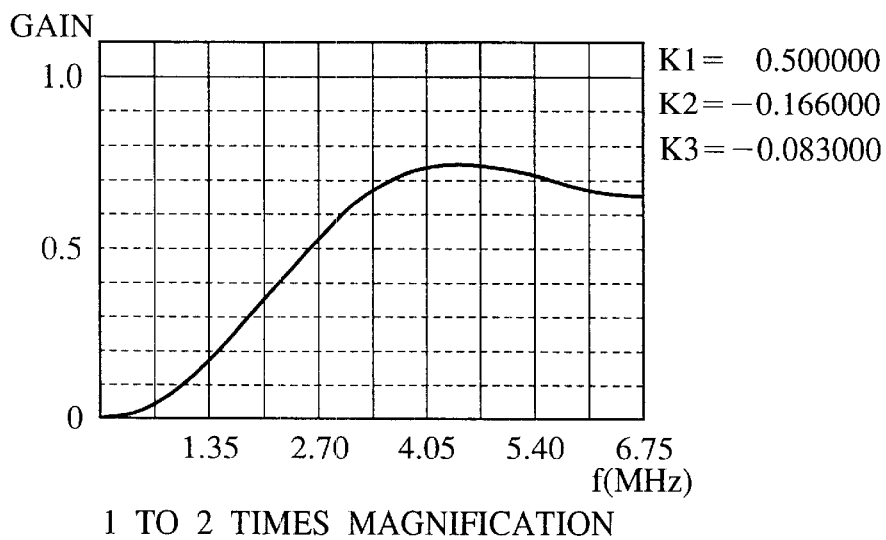
FIG.4A  1 TO 2 TIMES MAGNIFICATION
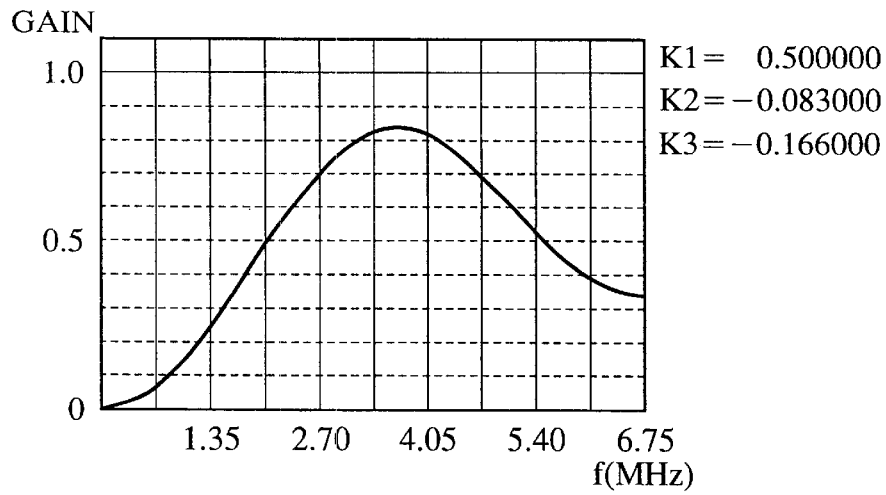
FIG.4B  2 TO 3 TIMES MAGNIFICATION
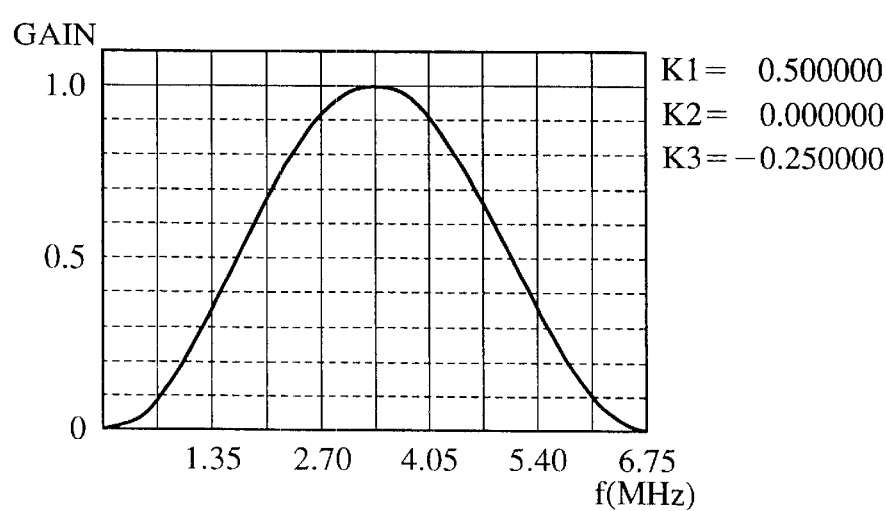
FIG.4C  3 TO 4 TIMES MAGNIFICATION

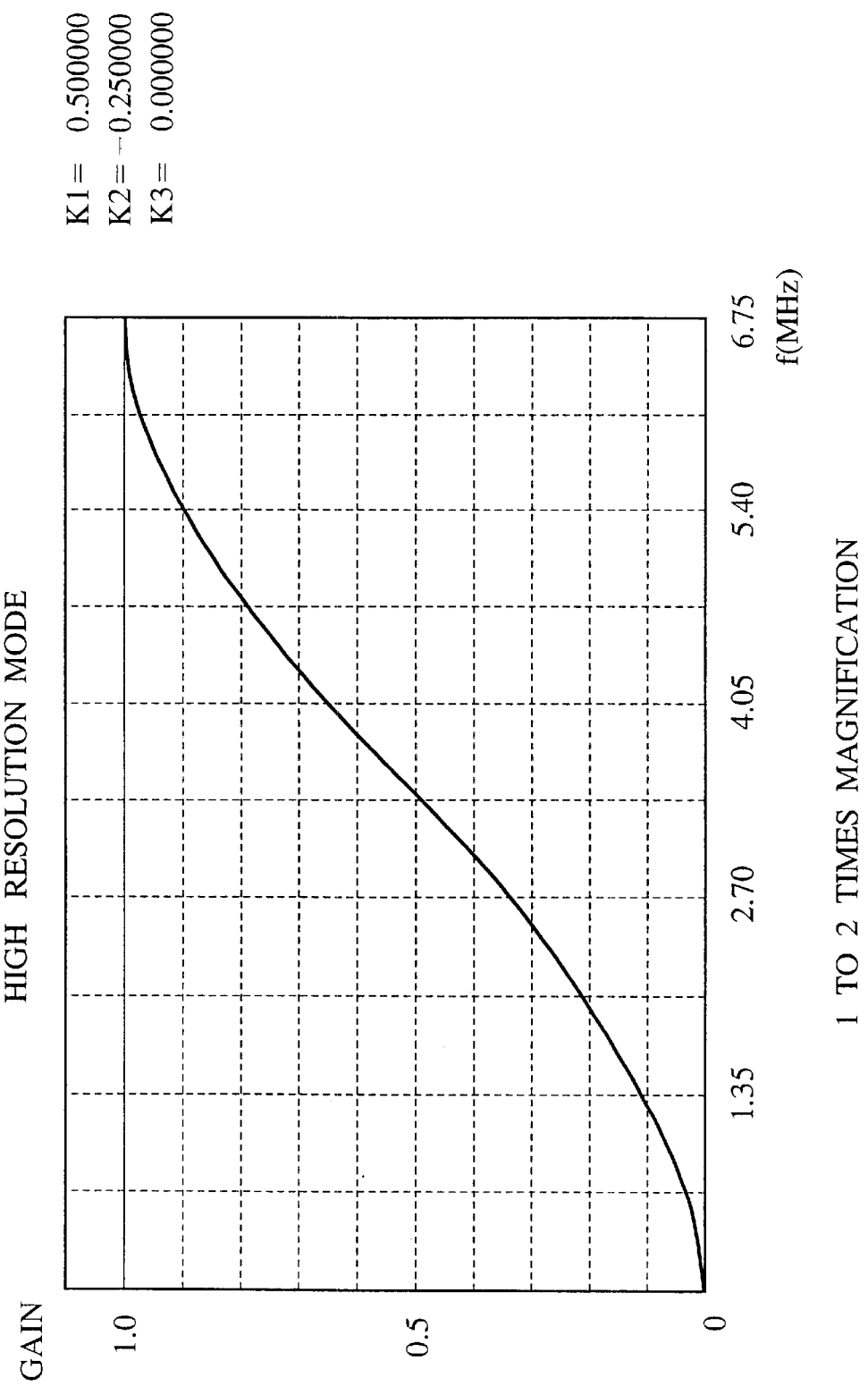

FIG.11A
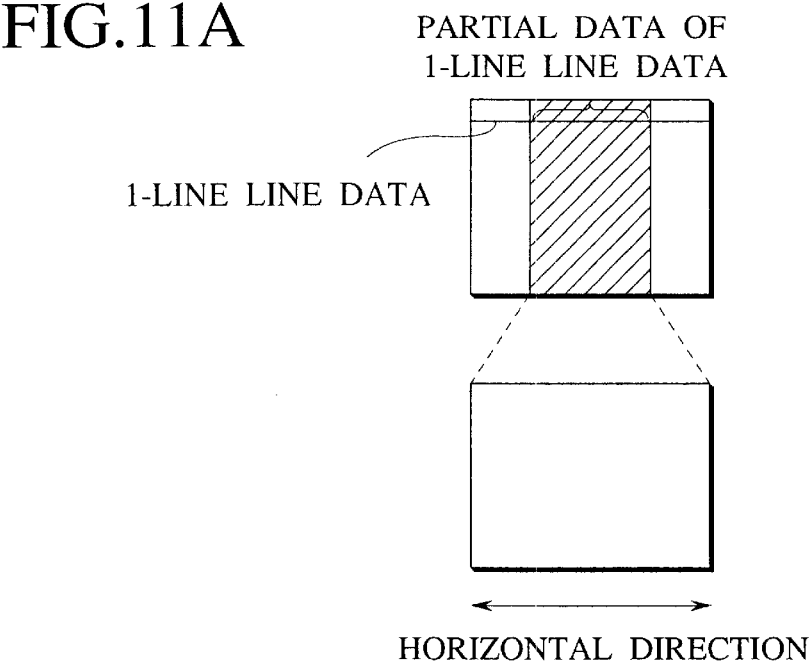
PARTIAL DATA OF 1-LINE LINE DATA
1-LINE LINE DATA
HORIZONTAL DIRECTION
FIG.11B
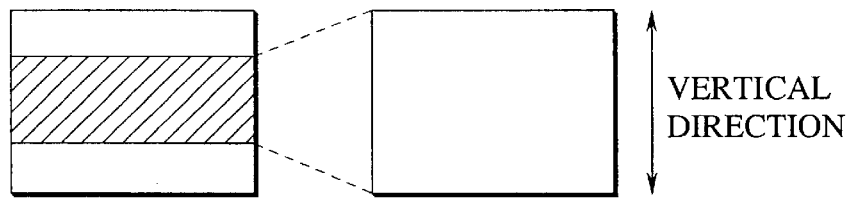
VERTICAL DIRECTION
FIG.12
TERMINAL (a) - - - - - [(b) CANNEL PROCESSING SYSTEM (n + 2) LINE]
TERMINAL (b) ———— [(a) CANNEL PROCESSING SYSTEM (n + 2) LINE]
TERMINAL (c) - - - - - [(b) CANNEL PROCESSING SYSTEM (n + 1) LINE]
TERMINAL (d) ———— [(a) CANNEL PROCESSING SYSTEM (n + 1) LINE]
TERMINAL (e) - - - - - [(b) CANNEL PROCESSING SYSTEM (n) LINE]
TERMINAL (f) ———— [(a) CANNEL PROCESSING SYSTEM (n) LINE]

FIG.14A

| | 8 BITS | 4 BITS | | | | | | | |
|---|---|---|---|---|---|---|---|---|---|
| TERMINAL (b) | Yb0 | Bb0 LOWER | Yb1 | Bb0 UPPER | Yb2 | Rb0 LOWER | Yb3 | Rb0 UPPER | Yb4 | Bb1 LOWER | Yb5 | Bb1 UPPER |
| TERMINAL (c) | Yc0 | Bc0 LOWER | Yc1 | Bc0 UPPER | Yc2 | Rc0 LOWER | Yc3 | Rc0 UPPER | Yc4 | Bc1 LOWER | Yc5 | Bc1 UPPER |
| TERMINAL (d) | Yd0 | Bd0 LOWER | Yd1 | Bd0 UPPER | Yd2 | Rd0 LOWER | Yd3 | Rd0 UPPER | Yd4 | Bd1 LOWER | Yd5 | Bd1 UPPER |
| TERMINAL (e) | Ye0 | Be0 LOWER | Ye1 | Be0 UPPER | Ye2 | Re0 LOWER | Ye3 | Re0 UPPER | Ye4 | Be1 LOWER | Ye5 | Be1 UPPER |
| TERMINAL (f) | Yf0 | Bf0 LOWER | Yf1 | Bf0 UPPER | Yf2 | Rf0 LOWER | Yf3 | Rf0 UPPER | Yf4 | Bf1 LOWER | Yf5 | Bf1 UPPER |

| | 8 BITS | | | | | |
|---|---|---|---|---|---|---|
| TERMINAL (k) | Yc0 | Yc1 | Yc2 | Yc3 | Yc4 | Yc5 |
| TERMINAL (l) | Yd0 | Yd1 | Yd2 | Yd3 | Yd4 | Yd5 |
| TERMINAL (m) | Ye0 | Ye1 | Ye2 | Ye3 | Ye4 | Ye5 |
| TERMINAL (n) | Yf0 | Yf1 | Yf2 | Yf3 | Yf4 | Yf5 |

FIG.14B

| | 8 BITS | | | | | |
|---|---|---|---|---|---|---|
| TERMINAL (g) | Yb0 | Yb1 | Yb2 | Yb3 | Yb4 | Yb5 |
| TERMINAL (h) | Yc0 | Yc1 | Yc2 | Yc3 | Yc4 | Yc5 |
| TERMINAL (i) | Yd0 | Yd1 | Yd2 | Yd3 | Yd4 | Yd5 |
| TERMINAL (j) | Ye0 | Ye1 | Ye2 | Ye3 | Ye4 | Ye5 |

FIG.14C

| | 8 BITS | | | | | |
|---|---|---|---|---|---|---|
| TERMINAL (o) | Bd0 | Bc0 | Rd0 | Rc0 | Bd1 | Bc1 |
| TERMINAL (p) | Be0 | Bd0 | Re0 | Rd0 | Be1 | Bd1 |

FIG.14D

IMAGE PICKUP APPARATUS EQUIPPED WITH COMPATIBLE-WITH-ZOOMING TYPE CONTOUR COMPENSATION CIRCUIT, COMPATIBLE-WITH-IMAGE-PICKUP-CONDITIONS TYPE IMAGE OUTPUT CIRCUIT, AND COMPATIBLE-WITH-ALL-PIXEL-READOUT-SYSTEM-SOLID-IMAGE-PICKUP-ELEMENT TYPE ELECTRONIC ZOOM CIRCUIT

BACKGROUND OF THE INVENTION

1. Field of the Invention

The present invention relates to an image output system which is suitably provided in an image processing system of, for example, a video camera apparatus, camera apparatus, computer system or the like.

The present invention relates to a contour compensation system which is suitably provided in an image processing system of, for example, a video camera apparatus, camera apparatus, computer system or the like and, more particularly, to a contour compensation system which is adapted to perform contour compensation processing with respect to an image data or image pickup data portion having a frequency band that corresponds to the zoom magnification of an electronic zoom of the image data or image pickup data.

The present invention relates to an electronic zoom circuit which enlarges electronically in, for example, a video camera apparatus a digital video signal input from the camera part, or a digital video signal reproduced from the video part.

2. Description of the Related Art

Presently, there is known a digital video camera apparatus which digitalizes an image pickup signal obtained by imaging a desired object and records it in a video cassette tape.

This digital video camera apparatus has inputted thereto an image pickup light by a CCD image sensor and thereby forms an analog image pickup signal that corresponds to the amount of this image pickup light. After having been amplified with a suitable gain and digitalized, this image pickup signal is subjected to gamma correction processing and then supplied to a contour compensation circuit. The contour compensation circuit forms contour compensation data having a prescribed stressed frequency of the image pickup data by the use of a contour compensation coefficient that is made to be a fixed value. It adds up this contour compensation data and the original image pickup data and thereby performs contour compensation processing on this image pickup data and supplies the resulting data to the electronic zoom circuit.

The electronic zoom circuit performs line interpolation processing or the like on the image pickup data having the contour compensation processing performed thereon, so that the image pickup data may have a magnification designated by the user, thereby electronically enlarging the imaged object and outputting the same. The image pickup data having had this electronic zoom processing performed thereon is stored once in a frame memory and is read out in units of a field by the image output circuit in correspondence with a record rate. And, prescribed video process processing is performed thereon and the resulting image pickup data is recorded in a video cassette tape.

However, the conventional digital video camera apparatus is so arranged that the image output circuit may read out the image data stored once in the frame memory as it is in a form divided in units of a field for recording thereof. Therefore, in the stage output from the frame memory, it cannot process the image pickup data whatsoever and so there was the problem that the image quality could not be improved. With a view to the fact that the characteristics of the image pickup data differ for each image pickup conditions, image pickup mode, or the like, there have hitherto been wanted developments of a digital video camera apparatus which can vary the characteristics of the output (recorded) image pickup data in correspondence with these conditions, mode or the like.

On the other hand, also, in the conventional digital video camera apparatus, the contour compensation coefficient of the contour compensation circuit is made to be a fixed value. As a result, the frequency band that is stressed by the contour compensation processing is limited (fixed). Therefore, there was the problem that when high-magnification electronic zoom processing was performed with the use of the electronic zoom circuit, the return noises increased with the result that the frequency characteristic and S/N ratio deteriorated, causing deterioration of the quality of the displayed image.

It is to be noted that while Japanese Patent Application Laid-Open Publication No. 5-122577 discloses a video camera apparatus that makes a variable control of the contour compensation coefficient value in correspondence with the enlargement factor of the electronic zoom and that thereby prevents the deterioration of the resolution, such a conventional technique is one which makes a variable control of the "correction level" by changing the contour compensation coefficient value equally. Namely, this technique realizes the contour compensation processing by making a vertical control of the level as a whole of the image pickup data. For this reason, it is difficult to perform excellent contour compensation processing and said technique does not go up to the stage of solving the above-described problems.

Meanwhile, in the electronic zoom circuit, it is possible to perform an electronic zoom control of not only a video signal input from the solid image pickup element but also a video signal reproduced from a digital video tape.

FIG. 1 is a block diagram illustrating an electronic zoom circuit that performs processing of a luminance signal by a spline interpolation system and that of a color difference signal by a linear interpolation system. To an input terminal In there is input a 12-bit video signal taken from a solid image pickup element or a 12-bit video signal reproduced from a digital video tape. Of this 12-bit input signal, an upper order 8-bit component signal is a luminance signal and a lower order 4-bit component signal is a color difference signal.

In FIG. 1, reference symbols L1, L2, L3 and L4 represent line memories in each of which there is stored a 1-line video signal and each of which delays this signal in units of one horizontal scanning time-period and sequentially outputs the resulting delayed signal. A reference symbol 60 represents a luminance signal/color difference signal separation circuit to which there are input the 1-line video signals from the line memories L1 to L4, each signal corresponding to one line and which separates the upper 8-bit luminance signal and lower 4-bit color difference signal and thereby outputs these separated signals.

Also, a reference symbol 61 represents a vertical spline interpolation circuit that performs vertical spline interpolation processing according to the 4-line luminance signals output from the luminance signal/color difference signal separation circuit 60. A reference symbol 62 represents a vertical linear interpolation circuit that performs vertical linear interpolation processing according to the 2-line color difference signals output from the luminance signal/color difference signal separation circuit 60.

Also, a reference symbol 63 represents a horizontal spline interpolation circuit that horizontally enlarges the luminance signal vertically enlargement processed by the vertical spline interpolation circuit 61. A reference symbol 64 represents a horizontal linear interpolation circuit that horizontally enlarges the color difference signal vertically enlargement processed by the vertical linear interpolation circuit 62.

With the above-described construction, the 12-bit video signal that is input to the input terminal In is subjected to selection of the output data or to adjustment of the timing by the line memories L1 to L4, whereby the resulting signals are input as the successive 4-line video signals to the luminance signal/color difference signal separation circuit 60.

Thereafter, 8-bit data of the luminance signal and 4-bit data of the color difference signal are processed, each, by the vertical and horizontal interpolation circuits. Here, while the color difference signal is output as 4-bit data, this signal is converted to an 8-bit data signal by a color difference 8-bit signal converter circuit not illustrated and, after passing through a video process executing system, is recorded into a digital video tape.

It is to be noted that in a case where reproducing a video signal recorded in the digital video tape and performing zoom processing on the reproduced video signal, also, since the reproduced video signal is composed of an 8-bit luminance signal and a 4-bit color difference signal, it is possible to perform zoom processing thereon also similarly by the electronic zoom circuit.

Meanwhile, there has in recent years been developed an all-pixel readout system solid image pickup element which can output 1-frame pixel data in units of a 1-field period, that has been taken thereinto in units of a 1-field period, in the form wherein this 1-frame pixel data is divided into even-line data, (a) channel data, and odd-line data, (b) channel data, such all-pixel readout system solid image pickup element being in the course of being adopted in the video camera apparatuses as well. However, in the electronic zoom circuit, it is not possible to perform zoom processing according to both of the even-line data and odd-line data that are output from the all-pixel readout system solid image pickup element.

Accordingly, it results that zoom processing is performed according to either one of the even-line data or odd-line data. As a result, it was only possible to obtain a zoomed image of the same quality as that which was attainable when zoom processing was performed using a conventional solid image pickup element which output even-line data or odd-line data in units of a 1-field.

SUMMARY OF THE INVENTION

The present invention has been made in view of the above-described problems and has an object to provide an image output apparatus which can vary the characteristic of image data output according to the image pickup conditions, image pickup mode, or the like, as well as an image pickup apparatus including the image output apparatus.

Also, another object of the present invention is to provide a contour compensation system which even in a case where performing, for example, high-magnification electronic zoom processing by the use of an electronic zoom circuit makes it possible to mitigate the return noises resulting from such electronic zoom processing or the like and thereby prevent the deterioration of the frequency characteristic and S/N ratio of the image and thereby enhance the quality of the displayed image, as well as an image pickup apparatus including the contour compensation system.

Further, still another object of the present invention is to provide an electronic zoom circuit which can perform zoom processing according to both of even-line data and odd-line data output from an all-pixel readout system solid image pickup element.

To attain the above object, there is provided an image output apparatus, comprising: image output means having an output mode in which first and second image data forming one image data are addition processed in a ratio of $\alpha:\beta$ other than the ratio therebetween whose value is 1 to thereby form first output image data whose amount is the same as that of the first or second image data, the first output image data being output therefrom; and the first and second image data are addition processed in an inverted ratio of $\beta:\alpha$ from the ratio therebetween that has been used when addition processing has been performed in order to form the first output image data to thereby form second output image data whose amount is the same as that of the first or second image data, the second output image data being output therefrom.

To attain the above object, there is provided an image output method comprising the steps of addition processing first and second image data forming one image data in a ratio of $\alpha:\beta$ other than the ratio therebetween whose value is 1 to thereby form first output image data whose amount is the same as that of the first or second image data and output the same, and addition processing the first and second image data in an inverted ratio of $\beta:\alpha$ from the ratio therebetween that has been used when addition processing has been performed in order to form the first output image data to thereby form second output image data whose amount is the same as that of the first or second image data and output the same.

To attain the above object, the present invention provides an image pickup apparatus, comprising: image pickup means for imaging an object and outputting image pickup data; and image output means having an output mode in which first and second image data supplied from the image pickup means as image data forming one image data by two image data are addition processed in a ratio of $\alpha:\beta$ other than the ratio therebetween whose value is 1 to thereby form first output image data whose amount is the same as that of the first or second image data, the first output image data being output therefrom; and the first and second image data are addition processed in an inverted ratio of $\beta:\alpha$ from the ratio therebetween that has been used when addition processing has been performed in order to form the first output image data to thereby form second output image data whose amount is the same as that of the first or second image data, the second output image data being output therefrom.

To attain the above object, there is provided an image pickup method, comprising: the step of imaging an object by image pickup means and thereby outputting first and second image data from the image pickup means as image data forming one image data by the first and second image data; and the step of addition processing the first and second image data obtained by execution of the preceding step in a ratio of $\alpha:\beta$ other than the ratio therebetween whose value is 1 to thereby form first output image data whose amount is the same as that of the first or second image data and output the same, and addition processing the first and second image data in an inverted ratio of $\beta:\alpha$ from the ratio therebetween that has been used when addition processing has been performed in order to form the first output image data to thereby form second output image data whose amount is the same as that of the first or second image data and output the same.

To attain the above object, there is provided a storage medium having Stored therein an image output program comprising the steps of addition processing first and second image data forming one image data in a ratio of $\alpha:\beta$ other than the ratio therebetween whose value is 1 to thereby form first output image data whose amount is the same as that of the first or second image data and output the same, and addition processing the first and second image data in an inverted ratio of $\beta:\alpha$ from the ratio therebetween that has been used when addition processing has been performed in order to form the first output image data to thereby form second output image data whose amount is the same as that of the first or second image data and output the same.

The image output system according to the present invention is so arranged that the system can perform addition processing on the respective image data in an optimum ratio in correspondence with the cases by having the above-described characteristic respective means (steps) and can improve the quality of the image through the enhancement of the frequency characteristic and through the enhancement of the S/N ratio.

It is to be noted that, assuming that the unit amount of, for example, each of the respective image data be "0.5", the wording of "the ratio of $\alpha:\beta$ whose value is 1" means that the ratio between the image data is "0.5:0.5". The wording of "the ratio of $\alpha:\beta$ whose value is other than 1" means that the ratio between the image data is "0.25:0.75"; "0.75:0.25", "0.45:0.55" or the like. Incidentally, it is added that these values are only illustrative with an aim to have a better understanding of the present invention.

On the other hand, while the image pickup apparatus associated with the contour compensation of the present invention has the respective characteristic means capable of solving the above-described problems as seen in the following description, the difference between the conventional technique and the present invention will now be made clear prior to the description thereof.

The video camera apparatus that is disclosed in Japanese Patent Application Laid-Open Publication No. 5-122577 previously referred to is so arranged as to change equally all the contour compensation coefficients and thereby make a variable control of the "correction level". In other words, it realizes contour compensation processing through a vertical control of the level as a whole of the image pickup data.

In contrast to this, the present invention is one which has been derived from a completely novel and advanced technical idea and is so arranged as to perform contour compensation processing on the "frequency band" of the image pickup data in correspondence with the zoom magnification of the electronic zoom, namely executes partial contour compensation process of the image pickup data.

Accordingly, to attain the above object, there is provided a contour compensation arrangement, comprising: electronic zoom means for electrically enlarging an image formed by image data; and contour compensation means for performing contour compensation processing with respect to an image data portion in a frequency band corresponding to a zoom magnification of the electronic zoom means.

To attain the above object, there is provided a contour compensation method, comprising the step of performing contour compensation processing with respect to an image data portion in a frequency band corresponding to a zoom magnification of an electronic zoom for electrically enlarging an image formed by image data.

To attain the above object, there is provided an image pickup apparatus, comprising: image pickup means for receiving an imaging light of an object and outputting image pickup data corresponding to the received imaging light; optical zoom means for performing optical enlargement processing on an imaged object image according to the imaging light of the object received by the image pickup means; and contour compensation means for performing contour compensation processing with respect to an image pickup data portion in a frequency band corresponding to a zoom magnification of the optical zoom means.

To attain the above object, there is provided an image pickup apparatus, comprising: image pickup means for receiving an imaging light of an object and outputting image pickup data corresponding to the received imaging light; electronic zoom means for performing electric enlargement processing on an imaged object image according to the image pickup data from the image pickup means; and contour compensation means for performing contour compensation processing with respect to an image pickup data portion in a frequency band corresponding to a zoom magnification of the electronic zoom means.

To attain the above object, there is provided an image pickup method, comprising: the step of imaging an object by image pickup means; the step of performing optical enlargement processing on an imaged object image according to an imaging light of an object received by the image pickup means; and the step of performing contour compensation processing with respect to an image pickup data portion in a frequency band corresponding to a zoom magnification of the enlargement processing step.

To attain the above object, there is provided an image pickup method, comprising: the step of imaging an object by image pickup means; the step of performing electric enlargement processing on an imaged object image according to an image pickup data from the image pickup means; and the step of performing contour compensation processing with respect to an image pickup data portion in a frequency band corresponding to a zoom magnification of the enlargement processing step.

To attain the above object, there is provided a storage medium having stored therein a contour compensation processing program that comprises: the step of performing contour compensation processing with respect to an image pickup data portion in a frequency band corresponding to a zoom magnification of an optical zoom.

To attain the above object, there is provided a storage medium having stored therein a contour compensation processing program that comprises: the step of performing contour compensation processing with respect to an image pickup data portion in a frequency band corresponding to a zoom magnification of an electronic zoom.

The contour compensation system according to the present invention realizes optimum contour compensation processing corresponding to the zoom magnification or the like and enhances the quality of the image by having the above-described characteristic respective means (steps).

To attain the above object, there is provided an electronic zoom circuit, comprising: first and second input means for having inputted thereto respectively first and second digital video data signals that are produced from first and second image data signals that form 1-frame image data that is output from a solid image pickup element in units of 1 field;

selection/separation/output means for having inputted thereto a first line data signal constituted by a plurality of horizontal scanning line data signals contained in the first video data signal and a second line video data signal contained in the second video data signal and constituted by a plurality of horizontal scanning line data signals vertically adjacent to a plurality of the horizontal scanning line data signals of the first line data signal, selecting a plurality of the vertically adjacent horizontal scanning line data signals of the first and second line data signals, separating a plurality of the selected horizontal scanning line data signals into luminance data signal and color difference data signal, and outputting the luminance data signal and color difference data signal; and pixel interpolation means for performing vertical and horizontal zoom processings according to the luminance data signal and color difference data signal output from the selection/separation/output means.

To attain the above object, there is provided an electronic zoom circuit, comprising: input means for having inputted thereto a digital video data signal reproduced from a storage medium; selection/separation/output means for having inputted thereto a line data signal constituted by a plurality of horizontal scanning line data signals contained in the video data signal, selecting a plurality of vertically adjacent horizontal scanning line data signals of the line data signals, separating a plurality of the selected horizontal scanning line data signals into luminance data signal and color difference data signal, and outputs the luminance data signal and color difference data signal; and pixel interpolation means for performing vertical and horizontal zoom processings according to the luminance data signal and color difference data signal output from the selection/separation/output means.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is a block diagram illustrating a contour compensation circuit that is provided in the image pickup system of the digital video camera apparatus;

FIGS. 4A to 4C are frequency characteristic diagrams illustrating contour compensation coefficients that are used when the contour compensation circuit performs contour compensation processing with respect to the frequency band of the image data;

FIG. 5 is a frequency characteristic diagram illustrating the contour compensation coefficients used in a high-resolution mode, of the contour compensation coefficients used when the contour compensation circuit performs contour compensation processing with respect to the frequency band of the image data;

FIGS. 11A and 11B are typical views illustrating examples in a case where the input video signal is magnified to a level that is twice higher;

FIG. 12 is a typical view illustrating a signal that is input to a vertical interpolation data selector;

FIGS. 14A to 14D are views illustrating video signals input to the vertical interpolation data selector and video signals output therefrom.

DESCRIPTION OF THE PREFERRED EMBODIMENTS

A preferred embodiment of an image pickup apparatus according to the present invention will now be explained in detail with reference to the accompanying drawings.

The image pickup apparatus according to the present invention can be applied to a digital video camera apparatus. This digital video camera apparatus is arranged to form image pickup data constituting a digital electric signal according to an imaging light taken into a CCD image sensor and to record this image pickup data into a so-called digital video cassette tape.

Figure 1:
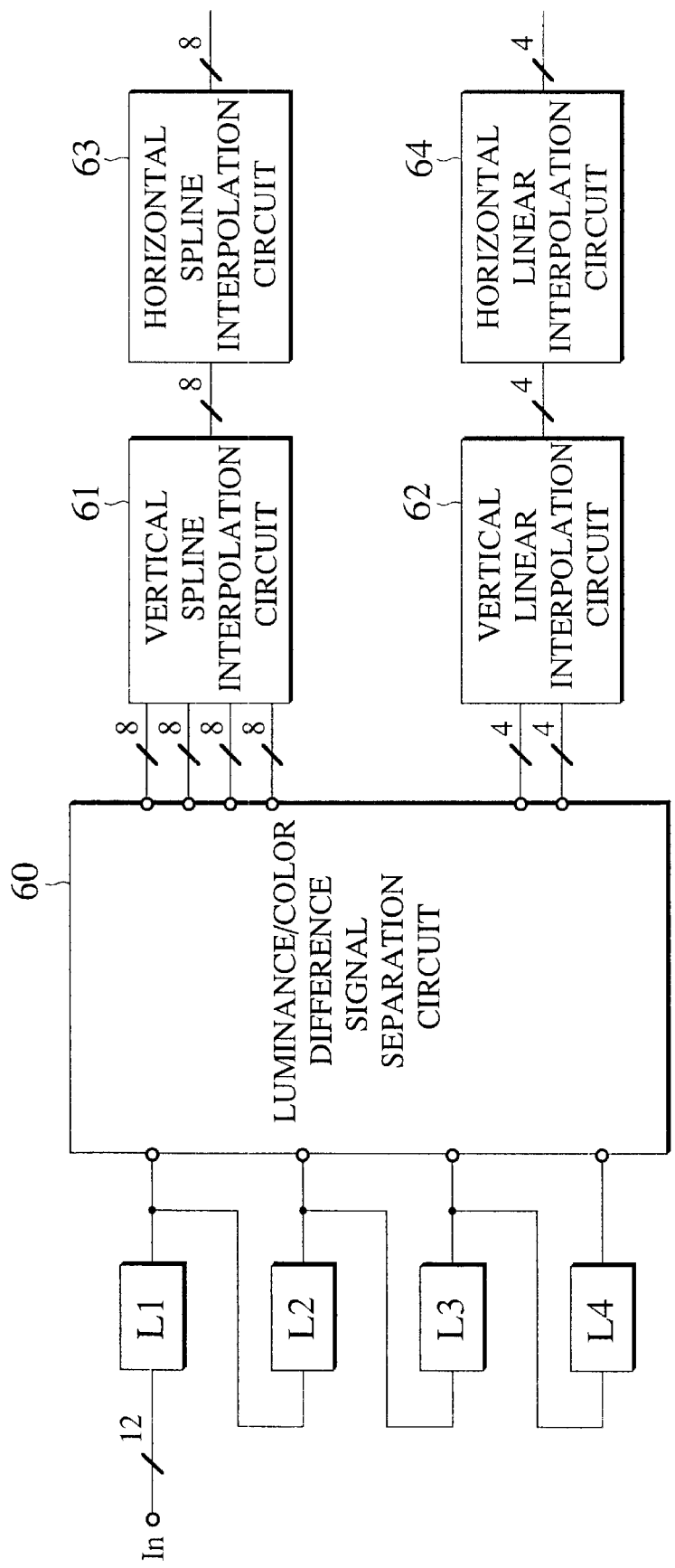
FIG. 1 is a block diagram illustrating a conventional electronic zoom circuit.
Figure 2:
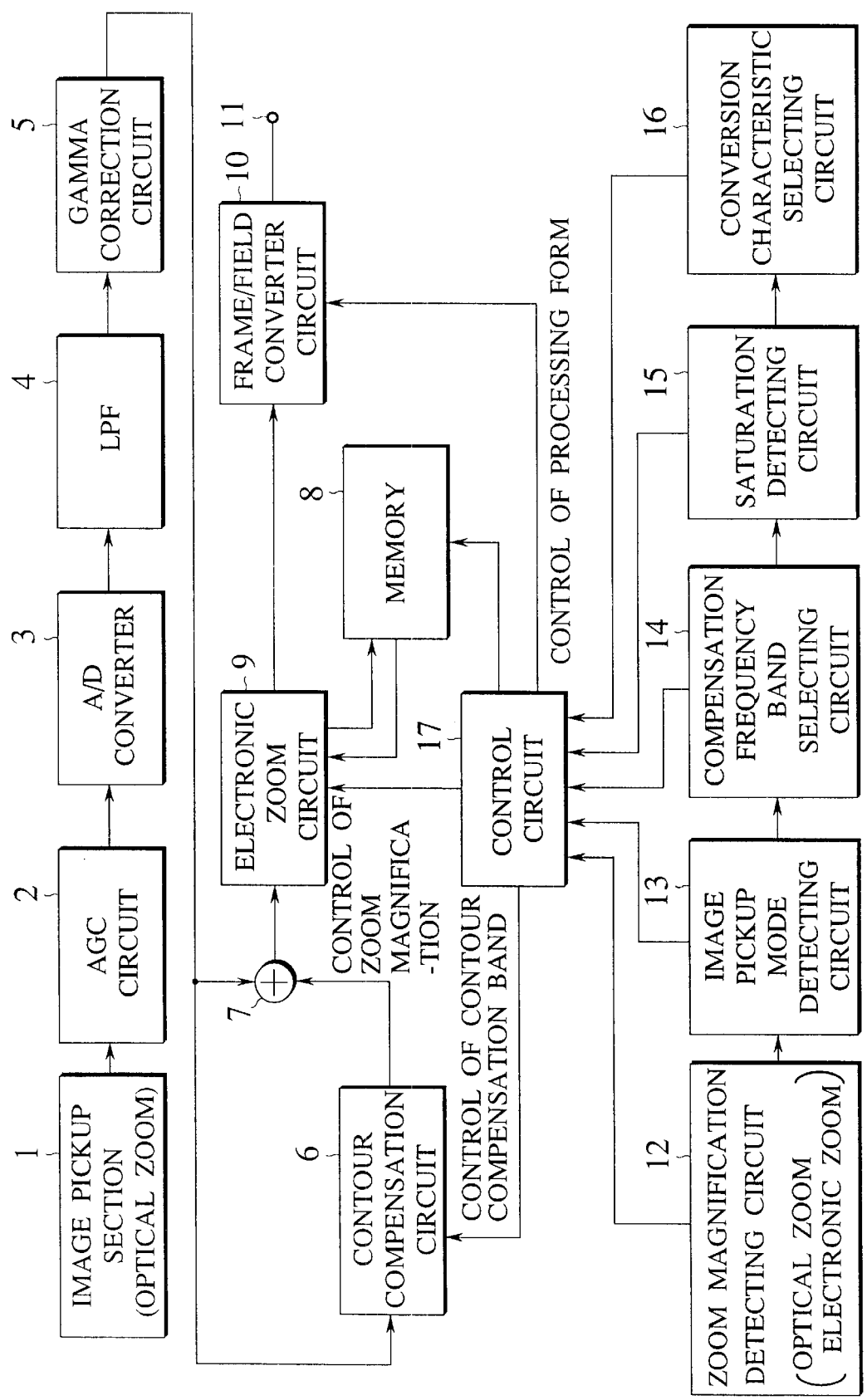
FIG. 2 is a block diagram illustrating an image pickup system of a digital video camera apparatus according to an embodiment of an image pickup apparatus of the present invention.

An image pickup system of the above-described digital video camera apparatus is constructed as illustrated in FIG. 2. The image pickup system is comprised of an image pickup section 1 that images an object and outputs an image pickup signal corresponding to the imaging light, an automatic gain control circuit (AGC circuit) 2 that amplifies the image pickup signal from the image pickup section 1 with a prescribed gain and outputs the resulting signal, an A/D converter 3 that converts the image pickup signal which is an analog signal from the AGC circuit 2 to the image pickup signal which is a digital data signal, a low pass filter (LPF) 4 that removes high-frequency noise components from the image pickup data signal from the A/D converter 3, and a gamma correction circuit 5 that performs gamma correction processing with respect to the image pickup data obtained through the LPF 4.

Also, this image pickup system is comprised of a contour compensation circuit 6 that forms and outputs contour compensation data for performing contour compensation processing with respect to a prescribed frequency band of the image pickup data from the gamma correction circuit 5, an adder 7 that adds the contour compensation data from the contour compensation circuit 6 to the image pickup data (original image pickup data) from the gamma correction circuit 5 and thereby performs contour compensation processing with respect to a prescribed frequency band of the image pickup data, an electronic zoom circuit 9 that controls the image pickup data supplied through the adder 7 so as to cause it to be stored once in a memory 8 and that performs electric enlargement or reduction processing (electronic zoom processing) of the image according to the image pickup data read out from the memory 8, and a frame/field converter circuit 10 that converts the image pickup data in a frame form from the electronic zoom circuit 9 to the image pickup data in a field form and outputs the resulting image pickup data through an output terminal 11. Although its explanation will be made later, the digital video camera apparatus according to this embodiment is arranged, as one of the characterizing features thereof, such that the contour compensation circuit 6 is provided in a stage that precedes the electronic zoom circuit 9.

Also, this image pickup system is comprised of a zoom magnification detecting circuit 12 that detects the zoom magnification of the optical zoom in the image pickup section 1 and of the electronic zoom in the electronic zoom circuit 9, an image pickup mode detecting circuit 13 that detects an image pickup mode, a compensation frequency band selecting circuit 14 that enables a user to select the frequency band with respect to which contour compensation processing is performed, a saturation detecting circuit 15 that detects the existence or non-existence of the saturation of the image pickup signal output from the image pickup section 1 according to the saturation level of the CCD image sensor provided in the image pickup section 1, and a conversion characteristic selecting circuit 16 that enables the user to select the output form of the image pickup signal from the frame/field converter circuit 10.

Also, the image pickup system is comprised of a control circuit 17 that performs a system control on the entire digital video camera apparatus. Especially, it performs contour compensation processing on a prescribed frequency band of the image pickup signal according to the respective detection outputs and selection output from the zoom magnification detecting circuit 12, image pickup mode detecting circuit 13 and compensation frequency band selecting circuit 14 and controls the output form of the image pickup data output from the frame/field converter circuit 10 according to the respective detection outputs and selection output from the image pickup mode detecting circuit 13, saturation detecting circuit 15 and conversion characteristic selecting circuit 16.

The storage mediums having stored therein an image output program and contour compensation processing program according to the present invention are mainly applied respectively to the frame/field converter circuit 10 and contour compensation circuit 6 of the above-described digital video camera apparatus. For convenience of explanation, the frame/field converter circuit 10 and contour compensation circuit 6 are each illustrated as one block in FIG. 2. However, the actual image output operation and contour compensation operation are each performed in the form of a software (may of course be performed in the form of a hardware). For this reason, the present invention is carried out by the control circuit 17 executing the image output program and contour compensation processing program stored in the storage mediums (ROM, RAM, HDD, etc.) provided inside or outside the control circuit 17. Accordingly, it should be understood that the acts of taking the image output program and contour compensation processing program into a computer system through, for example, an internet route and executing the same, and loading programs stored in a ROM disk down onto a HDD or the like of the computer system and executing the same, etc. are all included under the category of the present invention.

Next, the image pickup section 1 has, for example, the CCD image sensor provided therein by which the imaging light is taken in. Also, as such image pickup means, it may be arranged to provide an image pickup tube in place of the CCD sensor and take in the imaging light by the use of it. Also, as the CCD image sensor provided in the image pickup section 1 it is possible to provide a frame readout type CCD image sensor that reads out a 1-frame image pickup signal at one time and divides this 1-frame image pickup signal into respective field image pickup signals and outputs the divided image pickup signals, as well as a field readout type CCD image sensor that reads out image pickup signals in units of a field of even fields and odd fields and outputs them.

Although its explanation will be made later, the digital video camera apparatus is arranged to perform contour compensation processing with respect to luminance data (Y data). The data processing line that covers from the image pickup section 1 to the frame/field converter circuit 10 illustrated in FIG. 2 illustrates only the data processing line alone for use on the luminance data of the image pickup data composed of luminance data and color data (color difference data Cr, Cb). However, the followings should be understood here. In a case where having provided the field readout type CCD image sensor, since the luminance data of the respective fields are output therefrom, it should be understood that this data processing line exists in the form of two systems for use on the respective fields (two system data processing lines, i.e. a data processing line for use on even fields and a data processing line for use on odd fields). And in a case where having provided the frame readout type CCD image sensor, since the luminance data of each field divided from the frame data is sequentially output, it should be understood that the data processing line exists in the form of one system as illustrated in FIG. 2.

Also, although the explanation will proceed as performing contour compensation processing with respect to the luminance data, contour compensation processing may be performed with respect to the color data. In even this case, the operation of the contour compensation circuit 6 as explained later is applied as is and so contour compensation processing is performed on a prescribed frequency band of the color data by the use of the contour compensation coefficients for use on the color data.

Also, the image pickup section 1 has an optical zooming function (optical zoom) and is thereby so arranged as to enlarge or reduce an imaged object image to a size of a desired magnification in correspondence with a user s manipulation. This optical zoom and the above-described electronic zoom are arranged to be switched from one to the other of them so that the image may have a prescribed magnification. Specifically, for example, the imaged object image is optically enlarged within a range of from 1 to 20 times larger, and the imaged object image is enlarged to a size which is more than 20 times larger, the zoom mode is switched from the optical zoom to the electronic zoom, whereby the imaged object image which has been optically enlarged to a 20 times enlarged size is electrically enlarged up to a 4 times size. Accordingly, it is possible to enlarge the imaged object image up to an 80 times enlarged size by the combined use of the optical zoom and electronic zoom. Since this construction is only illustrative, it is of course possible to set to a desired size value (magnification) according to, e.g. the design.

Next, the operation of the digital video camera apparatus according to this embodiment that has the above-described construction will be explained.

First, upon start of the operation of imaging a desired object, the image pickup section 1 receives an imaging right of the object by the use of the CCD image sensor to thereby form an analog image pickup signal corresponding to the amount of the thus-received imaging light. It is to be noted that the zoom magnification of this imaged object image is optically changeable according to the user's manipulation through the operation of the optical zooming function provided in the image pickup section 1.

The image pickup signal from the image pickup section 1 is amplified with a prescribed gain by the AGC circuit 2 and then digitalized by the A/D converter 3. Then, the resulting signal has its high frequency noise components removed from the LPF circuit 4 and gamma correction processing is performed thereon by the gamma correction circuit 5. The resulting signal is supplied to the contour compensation circuit 6 and adder 7. Said resulting signal and the contour compensation data from the contour compensation circuit 6 are addition processed by the adder 7, whereby contour compensation processing is performed with respect to a prescribed frequency band of the resulting signal. And the signal is written into the memory 8 in units of a frame and the electronic zoom circuit 9 performs electric enlargement processing on the imaged object image through, for example, line interpolation processing in correspondence with the user's manipulation. Then, the resulting signal is output from the output terminal 11 by the frame/field converter circuit 10 in units of a field. The image pickup data that has been output from the output terminal 11 is supplied to a recording system by a prescribed video process being executed thereon and is digitally recorded onto a recording medium such as a digital video cassette tape.

Here, the contour compensation circuit 6 has a construction such as that illustrated in FIG. 3. As stated previously, the data processing line illustrated in FIG. 2 that covers from the image pickup section 1 to the frame/field converter circuit 10 represents the data processing line for use on the image pickup data and the luminance data from the gamma correction circuit 5 is supplied to an input terminal 21 illustrated in FIG. 3.

The digital video camera apparatus according to this embodiment is so arranged as to perform collectively the horizontal and vertical contour compensation processings by providing the contour compensation circuit 6 collectively in a stage that precedes the electronic zoom circuit 9. Therefore, the contour compensation circuit 6 has supplied thereto the horizontal and vertical luminance data in correspondence with the respective contour compensation processings through the control of the control circuit 17.

In this way, by providing the contour compensations circuit 6 collectively in the state that precedes the electronic zoom circuit 9, the horizontal and vertical data contour compensation processings can be performed collectively and therefore it is possible to use one memory concurrently both as a memory for use on the horizontal data and a memory for use on the vertical data. This makes it possible to simplify the construction of the apparatus.

It is to be noted that although in this example the contour compensation circuit 6 has been collectively provided in the preceding stage to the electronic circuit 9, it may be arranged that, for example, the contour compensation circuit for use on the horizontal data contour compensation and the contour compensation circuit for use on the vertical data contour compensation are provided in the stages that precede and succeed the electronic zoom circuit 9 in such a way that the former circuit is provided in the preceding stage to the electronic zoom circuit 9 and the latter circuit is provided in the succeeding stage to the electronic zoom circuit 9.

Next, the luminance data supplied from the input terminal 21 is supplied to a first delay circuit 22a and a fifth multiplier 24e. The first to fourth delay circuits 22a to 22d are connected in series with each other and perform, for example, one-horizontal line delay processings with respect to the luminance data supplied thereto and output the resulting luminance data. The luminance data output from the first delay circuit 22a, the luminance data output from the second delay circuit 22b, the luminance data output from the third delay circuit 22c and the luminance data output from the fourth delay circuit 22d are supplied respectively to the fourth multiplier 24d, third multiplier 24c, second multiplier 24b and first multiplier 24a.

To the respective multipliers 24a to 24e there are supplied contour compensation coefficient data from the control circuit 17 through the first to fifth input terminals 23a to 23e, as well as the above-described respective luminance data. As the contour compensation coefficient data there are previously detected the values which makes it possible to perform contour compensation processing on a prescribed frequency band of the luminance data according to the zoom magnifications of the optical zoom of the image pickup section 1 and electronic zoom of the electronic zoom circuit 9 and the image pickup mode, or user's selection, whereby these data values are tabled and stored in the control circuit 17. The control circuit 17 reads out prescribed contour compensation coefficient data from this coefficient table according to the zoom magnifications and image pickup mode, or the user's selection, and supplies these data values to the respective multipliers 24a to 24e.

Specifically, the zoom magnifications of the optical zoom and electronic zoom are detected by the zoom magnification detecting circuit 12 illustrated in FIG. 2. The zoom magnification detecting circuit 12 detects the zoom magnification in correspondence with the manipulating time period, etc. of an image pickup magnification varying key provided to the digital video camera apparatus and, upon detection thereof, this detection output is supplied to the control circuit 17. The control circuit 17 reads out prescribed contour compensation coefficient data from the coefficient table in correspondence with the detected output of the zoom magnification and supplies it to the respective multipliers 24a to 24e.

More specifically, explaining the zoom magnification of the electronic zoom as an example, in a case where this zoom magnification is from 1 to 2 times, there are used the contour compensation coefficient data that correspond to a frequency characteristic that linearly extends from a low band region to an intermediate band region and substantially flatly extends from the intermediate band region to a high band region as illustrated in FIG. 4A. In this case, for example, the value of "0.5" is supplied to the third multiplier 24c as a first contour compensation coefficient data K1 through the third input terminal 23c. The value of "−0.166" is supplied to the second and fourth multipliers 24b and 24d as a second contour compensation coefficient data K2 through the second and fourth input terminals 23b and 23d. And the value of "−0.083" is supplied to the first and fifth multipliers 24a and 24e as a third contour compensation coefficient data K3 through the first and fifth input terminals 23a and 23e.

Also, in a case where the zoom magnification of the electronic zoom is from 2 to 3 times, there are used the contour compensation coefficient data that correspond to a frequency characteristic that linearly extends from a low band region to an intermediate band region and gradually goes down in level from the intermediate band region to a high band region as illustrated in FIG. 4B. In this case, for example, the value of "0.5" is supplied to the third multiplier 24c as a first contour compensation coefficient data K1 through the third input terminal 23c. The value of "−0.083" is supplied to the second and fourth multipliers 24b and 24d as a second contour compensation coefficient data K2 through the second and fourth input terminals 23b and 23d. And the value of "−0.166" is supplied to the first and fifth multipliers 24a and 24e as a third contour compensation coefficient data K3 through the first and fifth input terminals 23a and 23e.

Also, in a case where the zoom magnification of the electronic zoom is from 3 to 4 times, there are used the contour compensation coefficient data that correspond to a frequency characteristic that linearly extends from a low band region to an intermediate band region and linearly goes down in level from the intermediate band region to a high band region as illustrated in FIG. 4C. In this case, for example, the value of "0.5" is supplied to the third multiplier 24c as a first contour compensation coefficient data K1 through the third input terminal 23c. The value of "±0" is supplied to the second and fourth multipliers 24b and 24d as a second contour compensation coefficient data K2 through the second and fourth input terminals 23b and 23d. And the value of "−0.25" is supplied to the first and fifth multipliers 24a and 24e as a third contour compensation coefficient data K3 through the first and fifth input terminals 23a and 23e.

Also, the image pickup mode selected by the user is detected by the image pickup mode detecting circuit 13 illustrated in FIG. 2. The image pickup mode detecting circuit 13 is arranged to detect an image pickup mode according to the manipulated condition, etc. of the image pickup mode selecting key for example provided in the digital video camera apparatus and, upon detection of the image pickup mode, supply the resulting detection output to the control circuit 17. The control circuit 17 reads out prescribed contour compensation coefficient data from the coefficient table in correspondence with this detected output of the image pickup mode and supplies it to the respective multipliers 24a to 24e.

For example, in a case where a high-resolution mode is selected from among a plurality of image pickup modes, the contour compensation coefficient data that correspond to a frequency characteristic that substantially linearly extends from a low band region to a high band region as illustrated in FIG. 5 are used. In this case, for example, the value of "0.5" is supplied to the third multiplier 24c as a first contour compensation coefficient data K1 through the third input terminal 23c. The value of "−0.25" is supplied to the second and fourth multipliers 24b and 24d as a second contour compensation coefficient data K2 through the second and fourth input terminals 23b and 23d. The value of "±0" is supplied to the first and fifth multipliers 24a and 24e as a third contour compensation coefficient data K3 through the first and fifth input terminals 23a and 23e.

Also, the frequency band contour compensation processed which is selected by the user is detected by the compensation frequency band selecting circuit 14 illustrated in FIG. 2. The compensation frequency band selecting circuit 14 is arranged to detect a frequency band selected by the user according to the manipulated condition, etc. of a key provided in the digital video camera for selecting the frequency band with respect to which contour compensation processing is performed in such a way that, for example, the frequency band is "low band, intermediate band or high band" and, upon detection of the frequency band, supply the resulting detection output to the control circuit 17. The control circuit 17 reads out prescribed contour compensation coefficient data from the coefficient table in correspondence with this detected output of the frequency band and supplies it to the respective multipliers 24a to 24e, as stated previously.

The above-described contour compensation coefficient data are values which have been obtained by the applicant of this application having repeatedly conducted trial procurement experiments concerning to what extent contour compensation processing should be performed with respect to which frequency band in order to procure a good quality of image. Also, whether a displayed image is good varies depending on the viewer's favor and so is not primarily determined. For this reason, the digital video camera apparatus is arranged so that the user can select the frequency band with respect to which contour compensation processing is to be performed so as to enable anyone to procure an image in his own favor.

Further, when enlarging an imaged object image through the electronic zoom, so-called "return noises" are generated. To prevent this, it is needed to provide a low pass filter in the stage that precedes the electronic zoom circuit 9. The contour compensation coefficient data has a value which enables a decrease in these generated return noises. Since the low pass filter necessitates the use of many taps, the provision thereof makes the construction complex. However, since in the digital video camera apparatus the contour compensation coefficient data has a value which enables a decrease in the return noises generated by the electronic zoom, it is possible to make the low pass filter unnecessary and thereby simplify the construction of the apparatus.

The first multiplier 24a performs multiplication processing on the luminance data supplied from the fourth delay circuit 22d and the third contour compensation coefficient data K3 supplied through the first input terminal 23a and supplies the resulting data to a first adder 25a. The second multiplier 24b performs multiplication processing of the luminance data supplied from the third delay circuit 22c and the second contour compensation coefficient data K2 supplied through the second input terminal 23b and supplies the resulting data to the first adder 25a. The first adder 25a performs addition processing on the multiplication output from the first multiplier 24a and the multiplication output from the second multiplier 24b and supplies the resulting data to a third adder 25c.

Similarly, the third multiplier 24c performs multiplication processing on the luminance data supplied from the second delay circuit 22b and the first contour compensation coefficient data K1 supplied through the third input terminal 23c and supplies the resulting data to a subtractor 26.

Also, the fourth multiplier 24d performs multiplication processing on the luminance data supplied from the first delay circuit 22a and the second contour compensation coefficient data K2 supplied through the fourth input terminal 23d and supplies the resulting data to a second adder 25b. The fifth multiplier 24e performs multiplication processing on the luminance data supplied directly from the input terminal 21 and the third contour compensation coefficient data K3 supplied through the fifth input terminal 23e and supplies the resulting data to the second adder 25b. The second adder 25b performs addition processing on the multiplication output from the fourth multiplier 24d and the multiplication output from the fifth multiplier 24e and supplies the resulting data to the third adder 25c.

The third adder 25c perform, addition processing on the respective added outputs from the first and second adders 25a and 25b and supplies the resulting addition data to the subtractor 26. The subtractor 26 performs subtraction processing from the multiplication output from the third multiplier 24c of the addition output from the third adder 25c and supplies the subtraction output to the adder 7 illustrated in FIG. 2 as contour compensation data through the output terminal 27.

The adder 7 performs addition processing on the luminance data supplied from the gamma correction circuit 5 and the contour compensation data from the contour compensation circuit 6 to thereby perform contour compensation processing on a prescribed frequency band of the luminance data in correspondence with the zoom magnification, image pickup mode, on the like, and supplies the resulting luminance data to the memory 8. The memory 8 stores once therein in units of a frame the luminance data supplied in units of a field and supplies the luminance data thus stored in units of a frame to the frame/field converter circuit 10 through the electronic zoom circuit 9. Although it, explanation will be given later in detail, the frame/field converter circuit 10 converts the luminance data supplied thereto in unit of a frame to the luminance data unified for each field and supplies this luminance data to a recording system through the output terminal 11.

In this way, the digital video camera apparatus performs contour compensation processing on the frequency band of the image data in correspondence with the zoom magnification, image pickup mode, or an user's selection. This make it possible to perform optimum contour compensation processing, corresponding to the user's manipulation, on the luminance data. This can prevent the degradation of the S/N ratio and that of the frequency characteristic which were problematic when having conducted an electronic zoom of high magnification.

Specifically, for example, in a case where having imaged an object using an electronic zoom at an infinitely long object distance (reduction: aside-side), it is generally known the high frequency components increase on the resulting display image. However, in this case, by using the contour compensation coefficient data having a frequency characteristic such as that illustrated in FIG. 4A stressing the high frequency region of from 5.4 MHz to 6.75 MHz, it is possible to stress the high frequency components of the display image and thereby obtain a more excellent level of display image. Conversely, in a case where having imaged an object using an electronic zoom at a short object distance (enlargement: tele-side), it is generally known that high frequency components decrease on the display image. However, in this case, by using the contour compensation coefficient data having a frequency characteristic such as that illustrated in FIG. 4B and stressing the intermediate region of from 2.7 MHz to 5.05 MHz, when magnifying, for example, an object person it is possible to cause this face surface to look gentle and thereby obtain a more excellent level of display image.

Also, since the contour compensation coefficient data used in the contour compensation processing has a value which enables a decrease in the return noises at the time of the electronic zoom, the digital video camera apparatus can prevent the occurrence of the inconvenience that the quality of the image degradates due to the electronic zoom. In addition, it enables the omission of the low pass filter that was needed to be provided in the stage that preceded the electronic zoom circuit 9 and thereby enables the simplification of the construction and the reduction in the cost of the apparatus.

Next, while the digital video camera apparatus is constructed so that the frame/field converter circuit 10 may concert the image pickup data of frame units read out from the memory 8 to the image pickup data of field units and output the resulting field-unit data, at this time there can be made selectable the output modes three in all, a first one of which is "a non-addition mode" for outputting the image pickup data of each field without performing addition processing thereon, a second one of which is "a 1/2 addition mode" for performing addition processing on the respective halves in value of the image pickup data of the respective fields and outputting the resulting addition data, and a third one of which is "a 1/4 addition mode" for performing addition processing on a quarter in value of the image pickup data of one field and three quarters in value of the image pickup data of the other field with respect to each field and outputting the resulting addition data.

Figure 6:
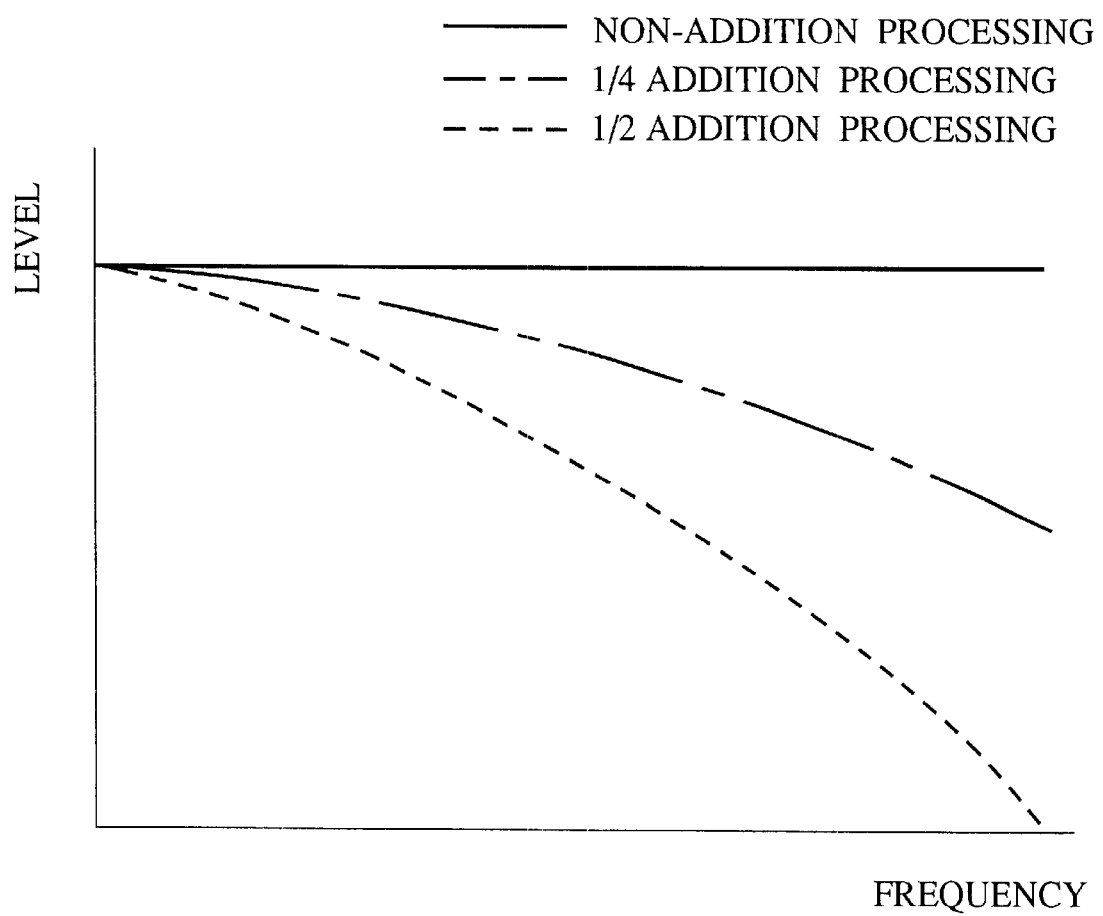
FIG. 6 is a graph illustrating the output characteristic of a frame/field converter circuit that is provided in the image pickup system of the digital video camera apparatus.

The frequency characteristic in the non-addition mode is such that the image pickup data of each field exhibits a flat characteristic from the low region to the high region as indicated in a solid line of FIG. 6. The frequency characteristic in the 1/2 addition mode is such that the image pickup data of each field exhibits a gradual decay from the low region to the high region as indicated in a dotted line of the same figure. Further, the frequency characteristic in the 1/4 addition mode is such that the image pickup data exhibits an intermediate frequency between the frequency characteristic exhibited in the non-addition mode and that exhibited in the 1/4 addition mode. These output modes are each made selectable by the user's manipulating the conversion characteristic selecting circuit 16 illustrated in FIG. 2, or made selectable according to the image pickup mode detected by the image pickup mode detecting circuit 13, or further made selectable according to the saturation level of the image pickup data of each field detected by the saturation detecting circuit 15. The control circuit 17 controls the frame/field converter circuit 10 as follows. In a case where as output mode has been selected by the conversion characteristic selecting circuit 16, the control circuit 17 selects this output mode preferentially and, in other cases, selects and optimum output mode according to the image pickup mode or saturation level.

Here, explaining the saturation level, upon reception of a large amount of imaging light, the CCD image sensor provided in the image pickup section 1 is brought to a state wherein the respective solid image pickup elements are saturated. Although the sensitivity characteristics of the respective solid image pickup elements are the same, there are actually the errors between the sensitivity characteristics thereof, etc. and this causes the differentiation in the level of the image pickup data of the respective fields. And, the problem that when having made image display flickers occur arises. Such being the case, the digital video camera apparatus is arranged to detect the saturation level of the image pickup data of each field by the saturation detecting circuit 15 and to select an optimum output mode from among the output modes according to this detection output.

Figure 7:
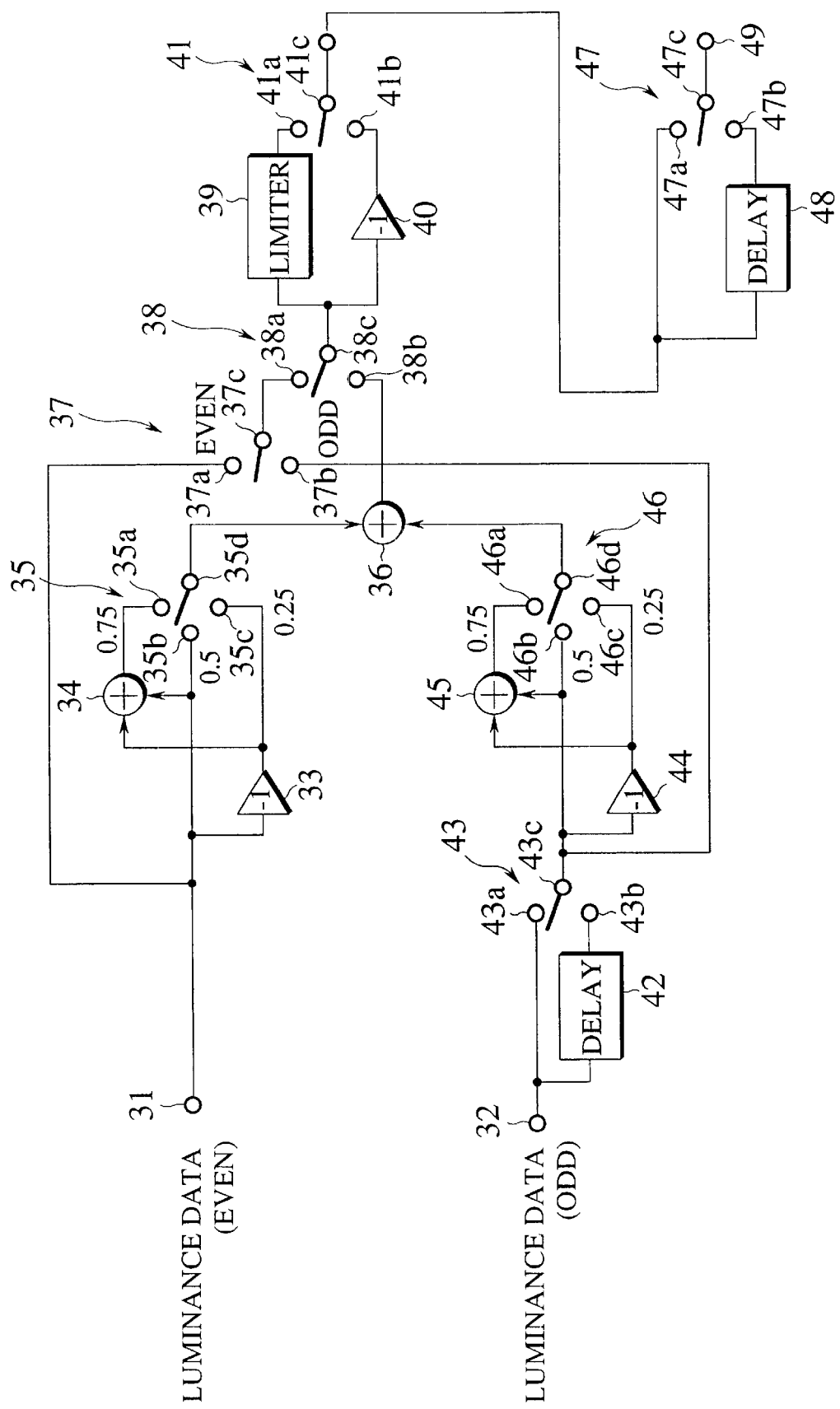
FIG. 7 is a block diagram illustrating a frame/field converter circuit for use on luminance data.

Next, of the frame/field converter circuit 10, the frame/field converter circuit for use on the luminance data is constructed as illustrated in FIG. 7, whereby the luminance data of even fields are supplied thereto through an input terminal 31 in units of one horizontal line and the luminance data of odd fields are supplied thereto through an input terminal 32 in units of one horizontal line.

In this FIG. 7, first, in a case where the "non-addition mode" in which the luminance data of the respective fields are output as are without being addition processed is executed, the control circuit 17 performs changeover control of a changeover switch 43 so that a selected terminal 43a may be selected by a selecting terminal 43c, performs changeover control of a changeover switch 38 so that a selected terminal 38a may be selected by a selecting terminal 38c, performs changeover control of a changeover switch 47 so that a selected terminal 47b may be selected by a selecting terminal 47c, and performs changeover control of a changeover switch 41 so that a selected terminal 41a may be selected by a selecting terminal 41c. And, the changeover switch 37 is changeover controlled so that, at the even-field time, a selected terminal 37a may be selected by a selecting terminal 37c and, at the odd-field time, a selected terminal 37b may be selected by a selecting terminal 37c.

As a result of this, at the even-field time, the luminance data of even fields supplied through the input terminal 31 are supplied to a delay circuit 48 through the changeover switches 37, 38, limiter 39 and changeover switch 41. And, the luminance data are delay processed by the delay circuit 48 by the time length corresponding to, for example, one horizontal line and are output to a recording system side through a changeover switch 47 and output terminal 49. Also, at the odd-field time, the luminance data of odd fields supplied through the input terminal 32 are supplied to a delay circuit 48 through the changeover switches 43, 37, 38, limiter 39 and changeover switch 41. And, the luminance data are delay processed by the delay circuit 48 by the time length corresponding to, for example, one horizontal line and are output to a recording system side through the changeover switch 47 and output terminal 49. It is to be noted that, as previously stated, the frequency characteristic of the image data at the "non-addition mode" time is as indicated in the solid line of FIG. 6.

Next, in a case where the "1/2-addition mode" in which the respective halves in value of the luminance data of the respective fields are addition processed is executed, the control circuit 17 performs changeover control of the changeover switch 43 so that at the even-field time a selected terminal 43a may be selected by a selecting terminal 43c and at the odd-field time a selected terminal 43b may be selected by the selecting terminal 43c and performs changeover control of the changeover switch 38 so that a selected terminal 38b may be selected by a selecting terminal 38c, and performs changeover control of the changeover switch 41 so that a selected terminal 41b may be selected by a selecting terminal 41c so as to select the output from a bit shifter 40.

Also, in addition to the above-described respective changeover controls, the control circuit 17 performs changeover control of a changeover switch 35 so that a selected terminal 35b may be selected by a selecting terminal 35d, performs changeover control of a changeover switch 46 so that a selected terminal 46b may be selected by a selecting terminal 46d, and performs changeover control of a changeover switch 47 so that at the even-field time a selected terminal 47b may be selected by a selecting terminal 47c so as to select the luminance data from the delay circuit 48 and at the odd-field time a selected terminal 47a may be selected by a selecting terminal 47c.

As a result of this, at the time when forming the luminance data of even fields, the luminance data of even fields that are supplied through the input terminal 31 are supplied to an adder 36 through the changeover switch 35, and the luminance data of odd fields that are supplied through the Input terminal 32 are supplied to the adder 36 through the changeover switches 43 and 46. The adder 36 performs addition processing on, for example, the halves in value of the respective luminance data from the changeover switches 35 and 46 and thereby forms the luminance data of even fields and supplies them to the bit shifter 40 through the changeover switch 38.

The luminance data supplied to the bit shifter 40 are ones with respect to which the respective luminance data of even fields and odd fields have been addition processed and therefore are each twice higher in level than the ordinary luminance data. For this reason, the bit shifter 40 performs 1-bit shift-down processing on that luminance data and thereby makes the level of this luminance data twice higher in level lower to 1/2 thereof to thereby make this luminance data have a "1" level as in the case of the ordinary luminance data and supplies it to the delay circuit 48. The delay circuit 48 performs delay processing corresponding to one horizontal line with respect to the luminance data from the bit shifter 40 to thereby make the timing thereof that of the even-field luminance data and supplies the resulting luminance data to a recording system side through the changeover switch 47 and the output terminal 49.

On the other hand, at the time when forming the luminance data of odd fields, the luminance data of even fields that are supplied through the input terminal 31 are supplied to the adder 36 through the changeover switch 35, and the luminance data of odd fields that are supplied through the input terminal 32 are delay processed by the time length corresponding to, for example, one horizontal line through the operation of the delay circuit 42, whereby the timing thereof is made to coincide with that of the luminance data of even fields supplied through the input terminal 31, and are supplied to the adder 36 through the changeover switches 43 and 46. The adder 36 performs addition processing on, for example, the halves in value of the respective luminance data from the changeover switches 35 and 46 and thereby forms the luminance data of odd fields and supplies them to the bit shifter 40 through the changeover switch 38.

The bit shifter 40 performs 1-bit shift-down processing on the luminance data supplied thereto and thereby makes the level of this luminance data twice higher in level lower to 1/2 thereof to thereby make this luminance data have a "1" level as stated previously and supplies the resulting luminance data as odd fields luminance data to a recording system side through the changeover switches 41, 47 and the output terminal 49.

As a result of this, it is possible to record the image data (see the dotted line of FIG. 6) improved in S/N by performing addition processing on the respective halves in value of the luminance data of the respective fields.

Next, in a case where regarding the luminance data of the respective fields there has been executed the "1/4 addition mode" for performing addition processing on a quarter in value of one field and three quarters in value of the other field with respect to the luminance field of each field and outputting the resulting luminance data, the control circuit 17 at the even-field time performs changeover control of the changeover switch 43 so that the selected terminal 43a may be selected by the selecting terminal 43c, performs changeover control of the changeover switch 35 so that the selected terminal 35a may be selected by the selecting terminal 35d so as to select the luminance data having a proportion of 0.75 as later described, performs changeover control of the changeover switch 46 so that the selected terminal 46c may be selected by the selecting terminal 46d so as to select the luminance data having a proportion of 0.25 as later described, and performs changeover control of the changeover switch 47 so that the selected terminal 47b may be selected by the selecting terminal 47c so as to select the delay output from the delay circuit 48.

Also, at the odd-field time, the control circuit 17 performs changeover control of the changeover switch 43 so that the selected terminal 43b may be selected by the selecting terminal 43c, performs changeover control of the changeover switch 35 so that the selected terminal 35c may be selected by the selecting terminal 35d so as to select the luminance data having a proportion of 0.25 as later described, performs changeover control of the changeover switch 46 so that the selected terminal 46a may be selected by the selecting terminal 46d so as to select the luminance data having a proportion of 0.75 as later described, and performs changeover control of the changeover switch 47 so that the selected terminal 47a may be selected by the selecting terminal 47c.

Also, either at the even-field time and at the odd-field time, the control circuit performs changeover control of the changeover switch 38 so that the selected terminal 38b may be selected by the selecting terminal 38c and performs changeover control of the changeover switch 41 so that the selected terminal 41b may be selected by the selecting terminal 41c so as to select the output from the bit shifter 40.

The luminance data of the even fields supplied through the input terminal 31 are supplied not only to an adder 34 but also to a bit shifter 33. Although these luminance data are each that having a proportion of 1, in this frame/field converter circuit 10 this luminance data having a proportion of 1 is regarded as the luminance data having a proportion of 0.5. And the bit shifter 33 performs 1-bit shift-down processing on the luminance data having a proportion of 0.5 to thereby form the luminance data having a proportion of 0.25 and then supplies it to the adder 34 and to the selected terminal 35c of the changeover switch 35. The adder 34 performs addition processing on the luminance data having a proportion of 0.5 supplied through the input terminal 31 and the luminance data having a proportion of 0.25 from the bit shifter 33 to thereby form the luminance data having a proportion of 0.75 and supplies it to the selected terminal 35a of the changeover switch 35.

Similarly, the luminance data of the odd fields supplied through the input terminal 32, when forming the luminance data of even fields, are supplied as are to an adder 45 and bit shifter 44 through the changeover switch 43 and, when forming the luminance data of odd fields, are delay processed by the time length corresponding to one horizontal line through the operation of the delay circuit 42 and are supplied to the adder 45 and bit shifter 44 through the changeover switch 43 with the same timing as that at which there are supplied thereto the luminance data of even fields supplied through the input terminal 31.

The bit shifter 44, as described above, performs 115 bit shift-down processing on the luminance data having a proportion of 0.5 to thereby form the luminance data having a proportion of 0.25 and then supplies it to the adder 45 and to the selected terminal 46c of the changeover switch 46. The adder 45 performs addition processing on the luminance data having a proportion of 0.5 supplied through the input terminal 32 and the luminance data having a proportion of 0.25 from the bit shifter 44 to thereby form the luminance data having a proportion of 0.75 and supplies it to the selected terminal 46a of the changeover switch 46.

As stated previously, when forming the luminance data of even fields, the control circuit 17 performs changeover control of the changeover switch 35 so that the selected terminal 35a may be selected by the selecting terminal 35d, and performs changeover control of the changeover switch 46 so that the selected terminal 46c may be selected by the selecting terminal 46d. As a result of this, the luminance data having a proportion of 0.75 is supplied to the adder 46 through the changeover switch 35 and the luminance data having a proportion of 0.25 is supplied thereto through the changeover switch 46. By adding the both luminance data together, the adder 36 forms the luminance data of even fields having a proportion of 1 whose level is twice higher than that of the ordinary luminance data.

This luminance data of even fields having a proportion of 1 is supplied to the bit shifter 40 through the changeover switch 38 and is shifted down by one bit and made to be the luminance data of even fields having an ordinary level, and is supplied to the delay circuit 48 through the changeover switch 41. The delay circuit 48 performs delay processing corresponding to, for example, one horizontal line on this luminance data to thereby make the timing thereof one for use on even fields and supplies the resulting luminance data to a recording system side through the changeover switch 47 and output terminal 49.

Similarly, when forming the luminance data of odd fields, the control circuit 17 performs changeover control of the changeover switch 35 so that the selected terminal 35c may be selected by the selecting terminal 35d, and performs changeover control of the changeover switch 46 so that the selected terminal 46a may be selected by the selecting terminal 46d. As a result of this, the luminance data having a proportion of 0.25 is supplied to the adder 36 through the changeover switch 35 and the luminance data having a proportion of 0.75 is supplied thereto through the changeover switch 46. By adding the both luminance data together, the adder 36 forms the luminance data of odd fields having a proportion of 1 whose level is twice higher than that of the ordinary luminance data.

This luminance data of odd fields having a proportion of 1 is supplied to the bit shifter 40 through the changeover switch 38 and is shifted down by one bit and made to be the luminance data of odd fields having an ordinary level, and is supplied to a recording system side through the changeover switches 41, 47 and output terminal 49.

As a result of this, it is possible to perform addition processing on the luminance data of the respective fields in the ratio of 0.75:0.25 or 0.25:0.75 and to prevent the degradation of the resolution in the vertical direction and thereby record the image data improved in S/N ratio(see the one-dot chain line of FIG. 6).

Incidentally, in the above-described "1/4 addition mode", when forming the luminance data of even fields, changeover control is performed of the changeover switch 35 so that the luminance data having a proportion of 0.75 may be selected and changeover control is performed of the changeover switch 46 so that the luminance data having a proportion of 0.25 may be selected. When forming the luminance data of odd fields, changeover control is performed of the changeover switch 35 so that the luminance data having a proportion of 0.25 may be selected and changeover control is performed of the changeover switch 46 so that the luminance data having a proportion of 0.75 may be selected.

However, in addition to this, this changeover control may be performed as follows. When forming the luminance data of even fields, changeover control is performed of the changeover switch 35 so that the luminance data having a performed of the changeover switch 46 so that the luminance data having a proportion of 0.75 may be selected. When forming the luminance data of odd fields, changeover control is performed of the changeover switch 35 so that the luminance data having a proportion of 0.75 may be selected and changeover control is performed of the changeover switch 46 so that the luminance data having a proportion of 0.25 may be selected.

Also, in even the same case where forming the luminance data of even fields, changeover control is performed of the changeover switch 35 so that the luminance data of 0.25 and the luminance data of 0.75 may be alternately selected in such a way that at the first time when forming the luminance data of even fields, changeover control is performed of the changeover switch 35 so that the luminance data having a proportion of 0.75 may be selected and changeover control is performed of the changeover switch 46 so that the luminance data having a proportion of 0.25 may be selected; at the second time when forming the luminance data of even fields, changeover control is performed of the changeover switch 35 so that the luminance data having a proportion of 0.25 may be selected and changeover control is performed of the changeover switch 46 so that the luminance data having a proportion of 0.75 may be selected; and at the third time when forming the luminance data of even fields, changeover control is performed of the changeover switch 35 so that the luminance data having a proportion of 0.25 may be selected and changeover control is performed of the changeover switch 46 so that the luminance data having a proportion of 0.75 may be selected. The same applies to the case where performing changeover control of the changeover switch 46.

In this case, when the luminance data from the respective changeover switches 35 and 46 have been addition processed in the adder 36, the changeover switch 46 is changeover controlled so that the luminance data having a proportion of 1 may be formed in such a way that, for example, when the changeover switch 35 has been changeover controlled so that the luminance data having a proportion of 0.75 may be selected, the changeover switch 46 is changeover controlled so that the luminance data having a proportion of 0.25; and when the changeover switch 35 has been changeover controlled so that the luminance data having a proportion of 0.25 may be selected, the changeover switch 46 is changeover controlled so that the luminance having a proportion of 0.75 may be selected.

Figure 8:
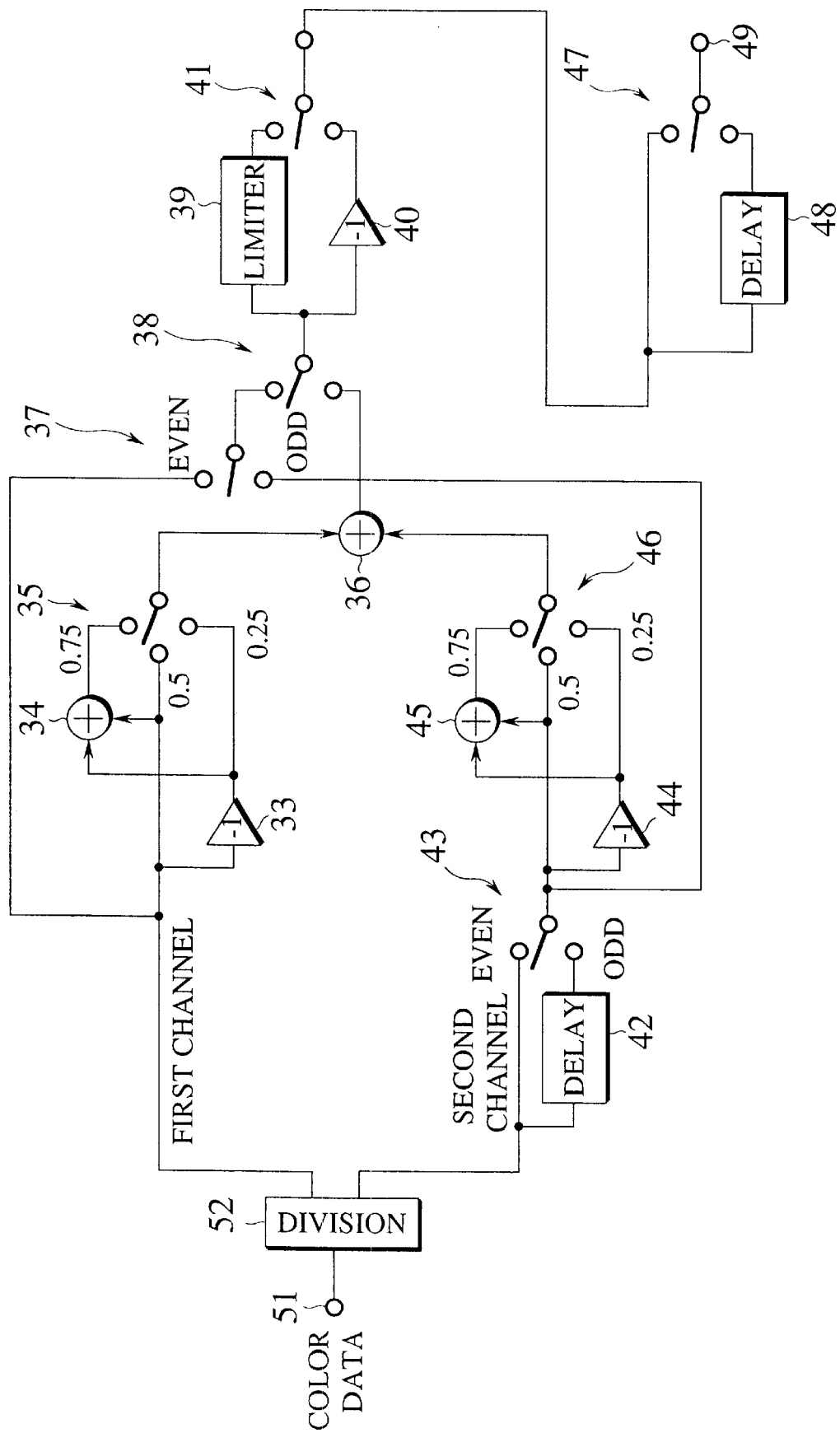
FIG. 8 is a block diagram illustrating a frame/field converter circuit for use on color data.

Next, although the foregoing description has been given of the frame/field converter circuit for use on the luminance data under the hardware category of the frame/field converter circuit 10, as this hardware there is also provided a frame/field converter circuit for use on the color data, whose construction is as illustrated in FIG. 8.

It is to be noted that as seen in this FIG. 8 this frame/field converter circuit for use on the color data has a construction provided with a dividing circuit 52 in an input stage of the frame/field converter circuit for use on the luminance data. Therefore, since although there is the difference that as the data to be processed by the two circuits the data processed by one of the two is the luminance data and the data to be processed by the other thereof is the color data such data is processed through the same operation, in the description of the frame/field converter circuit for use on this color data, the portions performing the same operation as that performed in the frame/field converter circuit for use on the luminance data are denoted by like reference symbols and a detailed explanation thereof is omitted.

Namely, the frame/field converter circuit for use on the color data has, in addition to the construction of the frame/field converter circuit for use on the luminance data, an input terminal 51 to which the color data is supplied and a dividing circuit 52 for dividing the color data supplied through this input terminal 51 into color data of two When the color data is supplied through the input terminal 51, the frame/field converter circuit for use on the color data operates in such a way that the dividing circuit 52 divides this color data into color data of a first channel and color data of a second channel and outputs these two color data.

In the "non-addition mode", "1/2 addition mode" and "1/4 addition mode", the respective changeover switches 35, 37, 38, 41, 43, 46 and 47 are changeover controlled in the same way as in the case of the above-described frame/field converter circuit for use on the luminance data, whereby the color data that correspond to the respective modes are output.

Namely, in the "non-addition mode", at the time of even fields, the color data of the first channel from the dividing circuit 52 is supplied to the limiter 39 through the changeover switches 37 and 38 and thereby made to have a prescribed number of bits and thereafter is supplied to the delay circuit 48 through the changeover switch 41. Then, in this delay circuit 48, delay processing corresponding to, for example, one horizontal line is performed on this color data, whereby the resulting color data is supplied to a recording system side through the changeover switch 47 and output terminal 49.

Also, in the "non-addition mode", at the time of odd fields, the color data of the second channel from the dividing circuit 52 is supplied to the limiter 39 through the changeover switches 43, 37 and 38 and thereby made to have a prescribed number of bits by this limiter 39 and thereafter is supplied to the delay circuit 48 through the changeover switch 41. Then, in this delay circuit 48, delay processing corresponding to, for example, one horizontal line is performed on this color data, whereby the resulting color data is supplied to a recording system side through the changeover switch 47 and output terminal 49.

As a result of this, the color data (non-addition color data) that has been changeover controlled by the changeover switch 37 in units of each of the respective fields is supplied to a recording system side.

At the time of even fields in the "1/2 addition mode", the first-channel color data is supplied to the adder 36 through the changeover switch 35 and the second-channel color data is supplied to the adder 36 through the changeover switches 43 and 46. Then, the respective color data are addition processed by the adder 36 and the resulting color data is supplied to the bit shifter 40 through the changeover switch 38 and made to have an ordinary level by it. Then, the resulting color data is supplied to the delay circuit 48 through the changeover switch 41, in which the timing of this color data is made to coincide with a timing at which the color data of even fields is supplied and the resulting color data is supplied to a recording system side through the changeover switch 47 and output terminal 49.

Also, at the time of odd fields in the "1/2 addition mode", the first-channel color data is supplied to the adder 36 through the changeover switch 35 and the second-channel color data is made to coincide in timing with the first-channel color data in the delay circuit 42 and supplied to the adder 36 through the changeover switches 43 and 46. Then, the both color data are addition processed by the adder 36 and the resulting color data is supplied to the bit shifter 40 through the changeover switch 38 and made to have an ordinary level by it. Then, the resulting color data is supplied to a recording system side through the changeover switches 41 and 47 and output terminal 49.

In this "1/2 addition mode", since the color data of the respective channels are addition processed by the adder 36 in the ratio of 1/2(0.5):1/2(0.5), it is possible to improve the S/N ratio of the color data.

At the time of even fields in the "1/4 addition mode", the first-channel color data is made to be color data having a proportion of 0.75 by the bit shifter 33 and adder 34 and supplied to the adder 36. On the other hand, the second-channel color data is made to be color data having a proportion of 0.25 by the bit shifter 44 and supplied to the adder 36. Then, the both color data are addition processed by the adder 36 and the resulting color data is supplied to the bit shifter 40 through the changeover switch 38 and made to have an ordinary level by it. Then, the resulting color data is supplied to the delay circuit 48 through the changeover switch 41 and thereby made to have the same timing as that at which the color data of even fields is supplied, and the resulting color data is supplied to a recording system side through the changeover switches 47 and output terminal 49.

Also, at the time of odd fields in the "1/4 addition mode", the first-channel color data is made to be color data having a proportion of 0.25 by the bit shifter 33 and supplied to the adder 36. On the other hand, the second-channel color data is made to have the same timing as that of the first-channel color data by the delay circuit 42 and made to be color data having a proportion of 0.75 by the bit shifter 44 and adder 45 and then supplied to the adder 36. Then, the both color data are addition processed by the adder 36 and the resulting color data is supplied to the bit shifter 40 through the changeover switch 38 and made to have an ordinary level by it. Then, the resulting color data is supplied to a recording system side through the changeover switches 41 and 47 and output terminal 49.

In this "1/4 addition mode", it is possible to perform addition processing on the color data of the respective fields in the ratio of 0.75:0.25 or 0.25:0.75 and to prevent the degradation of the resolution in the vertical direction and thereby record the image data improved in S/N ratio.

Incidentally, in the above-described "1/4 addition mode", when forming the color data of even fields, changeover control is performed of the changeover switch 35 so that the color data having a proportion of 0.75 may be selected and changeover control is performed of the changeover switch 46 so that the color data having a proportion of 0.25 may be selected. When forming the color data of odd fields, changeover control is performed of the changeover switch 35 so that the color data having a proportion of 0.25 may be selected and changeover control is performed of the changeover switch 46 so that the color data having a proportion of 0.75 may be selected.

However, in addition to this, this changeover control may be performed as follows. When forming the color data of even fields, changeover control is performed of the changeover switch 35 so that the color data having a proportion of 0.25 may be selected and changeover control is performed of the changeover switch 46 so that the color data having a proportion of 0.75 may be selected. When forming the color data of odd fields, changeover control is performed of the changeover switch 35 so that the color data having a proportion of 0.75 may be selected and changeover control is performed of the changeover switch 46 so that the color data having a proportion of 0.25 may be selected.

Also, in even the same case where forming the color data of even fields, changeover control may be performed of the changeover switch 35 so that the color data of 0.25 and the color data of 0.75 may be alternately selected in such a way that at the first time when forming the color data of even fields, changeover control is performed of the changeover switch 35 so that the color data having a proportion of 0.75 may be selected and changeover control is performed of the changeover switch 46 so that the color data having a proportion of 0.25 may be selected; at the second time when forming the color data of even fields, changeover control is performed of the changeover switch 35 so that the color data having a proportion of 0.25 may be selected and changeover control is performed of the changeover switch 46 so that the color data having a proportion of 0.75 may be selected; and at the third time when forming the color data of even fields, changeover control is performed of the changeover switch 35 so that the color data having a proportion of 0.25 may be selected and changeover control is performed of the changeover switch 46 so that the color data having a proportion of 0.75 may be selected. The same applies to the case where performing changeover control of the changeover switch 46.

In this case, when the color data from the respective changeover switches 35 and 46 have been addition processed in the adder 36, the changeover switch 46 is changeover controlled so that the color data having a proportion of 1 may be formed in such a way that, for example, when the changeover switch 35 has been changeover controlled so that the color data having a proportion of 0.75 may be selected, the changeover switch 46 is changeover controlled so that the color data having a proportion of 0.25 may be selected; and when the changeover switch 35 has been changeover controlled so that the color data having a proportion of 0.25 may be selected, the changeover switch 46 is changeover controlled so that the color data having a proportion of 0.75 may be selected.

In this way, the digital video camera apparatus makes it possible to select the respective output modes of the luminance and color data according to the image pickup mode detected by the image pickup mode detecting circuit 13, the saturation level of the image pickup data of the respective fields that has been detected by the saturation detecting circuit 15, or an user's selection. As a result of this, it is possible to select the output mode enabling the display of an image wanted by the user.

Incidentally, although the foregoing explanation has been given as performing addition processing on the respective luminance data or respective color data in the ratio of 0.25:0.75, this addition processing may be performed in another ratio of 0.30:0.70 or 0.40:0.60 for example. However, assuming that addition processing be performed in the ratio of 0.25:0.75, it is possible to form the luminance data having a proportion of 0.25 for example merely by performing 1-bit shift-down processing, by the bit shifters 33 and 44, on the ordinary luminance data that has been regarded as having a proportion of 0.5 for example and thereby form the luminance data having a proportion of 0.75 for example by performing addition processing, by the adders 34 and 45, on the luminance data having proportion of 0.25 for example and the luminance data having a proportion of 0.5 for example. Therefore, it is possible to form the luminance data, etc. addition processed by the use of simple circuits, bit shifter and adder, in a prescribed ratio therebetween and also to achieve the simplification of the construction, and the cost reduction, of the frame/field converter circuit 10.

Finally, although the foregoing explanation of this embodiment has been given in the form wherein the image pickup apparatus according to the present invention is a digital video camera apparatus, this is only one form of embodiment of the present invention. That is, the present invention can be applied to any apparatus if this apparatus is that electrically handling image data such as a camera apparatus with no recording system or an image processing system of a computer system. Further, the apparatus handling electric image data may be not only an apparatus handling it digitally but also an apparatus handling it on an analog basis. Further, in even other forms of embodiment than that described above, the invention can of course be variously modified according to the design, etc. if the modifications made thereof fall under the range in which they do not depart from the technical concept of the invention.

As has been explained above, the image pickup apparatus according to the present invention enables the enhancement of the quality of the displayed image by improving the characteristic and S/N ratio of the image data.

Also, for example, in even a case where having performed high-magnification electronic zoom processing, etc. by the use of the electronic zoom circuit, it is possible to mitigate the increase in the return noises which generate as a result of this. Therefore, it is possible to enhance the quality of the displayed image by preventing the degradation of the characteristic and S/N ratio of the image data.

Next, an embodiment of the electronic zoom circuit according to the present invention will be explained in detail with reference to the accompanying drawings.

The electronic zoom circuit according to the present invention is characterized by being used in a video camera apparatus which adopts a solid image pickup element of an all-pixel independently reading out type, whereby a high quality of zoom image is procured with a circuit small in scale.

Figure 9:
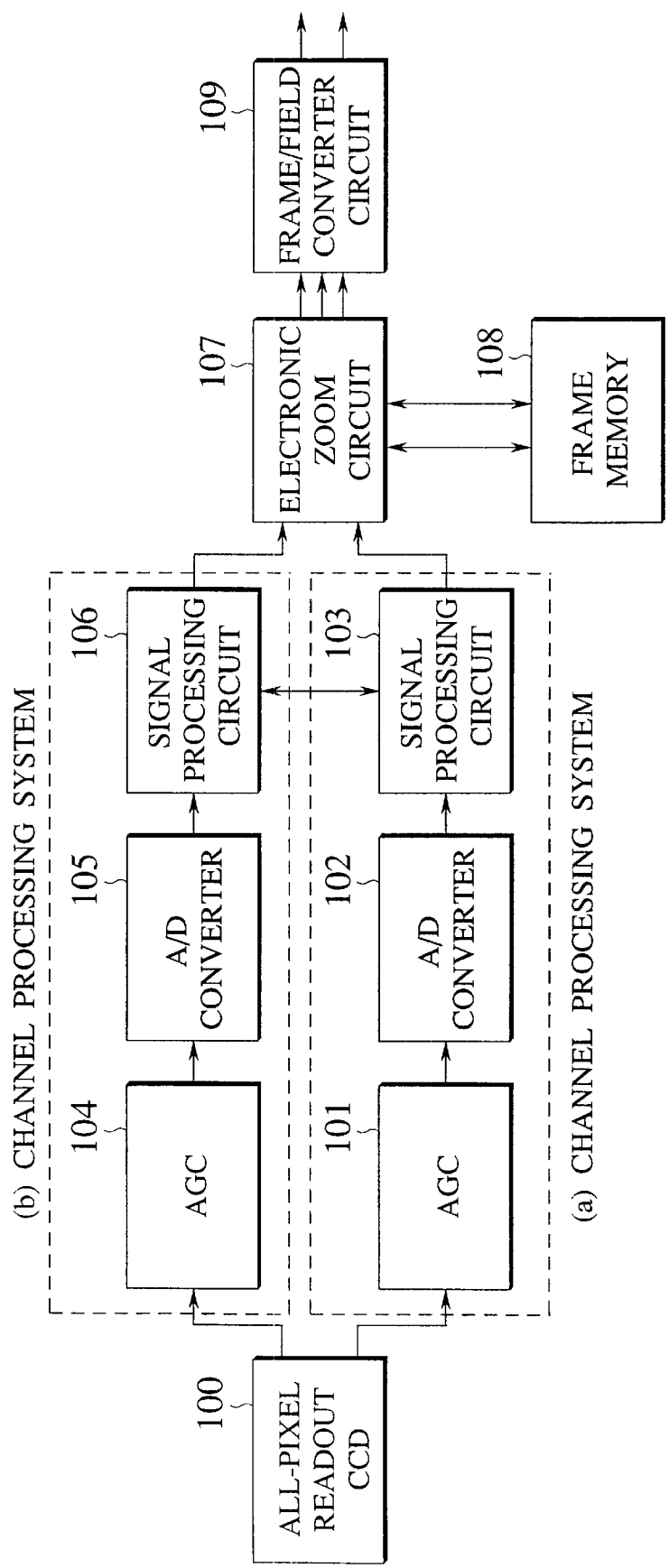
FIG. 9 is a block diagram illustrating a video camera apparatus that uses an electronic zoom circuit according to the present invention.

FIG. 9 is a block diagram illustrating a video camera apparatus that uses the electronic zoom circuit according to the present invention.

In FIG. 9, a reference symbol 100 represents an all-pixel independently reading out type solid image pickup element (hereinafter referred to also as "an all-pixel readout CCD") which makes it possible to divide 1-frame pixel data of a video signal taken thereinto in units of a 1-field time period into (a) channel even-line data and (b) channel odd-line data and output it in this divided form. The signals that are output therefrom are respectively independently processed by an (a) channel.processing system composed of circuit components 101 to 103 and a (b) channel processing system composed of circuit components 104 to 106.

Here, on the all-pixel readout CCD 100, a plurality of the solid image pickup elements are arranged on one horizontal line, whereby when this horizontal line is plurally repeated in the vertical direction and the solid image pickup elements are thereby arranged in the form of a matrix, a first horizontal one even-order line is processed by the (a) channel processing system and one odd-order line paired with this one even-order line is processed by the (b) channel processing system.

A reference symbol 101 in the (a) channel processing system represents an automatic gain control circuit (hereinafter referred to also as "an AGC") that amplifies with a suitable gain an analog video signal from the all-pixel readout CCD 100, a reference symbol 102 represents an A/D converter that converts the video signal from the AGC 101 to a digital video signal, and a reference symbol 103 represents a signal processing circuit that processes the digital video signal from the A/D converter 102 to luminance signal and color difference signal suitable when recording the digital video signal from the A/D converter 102 into a digital video tape. A 12-bit digital video signal that is composed of a luminance signal having an upper order of 8 bits and a color difference signal having a lower order of 4 bits is output from the signal processing circuit 103.

In the circuit components 104 to 106 of the (b) channel processing system, also, there are performed the same processings as those performed in the circuit components 101 to 103 of the (a) channel processing system, whereby a 12-bit digital video signal is output therefrom.

Here, the signal processing circuit 103 outputs the 12-bit digital video signal while referring to the output signal from the A/D converter 105 input to the signal processing circuit 106 while, on the other hand, the signal processing circuit 106 outputs the 12-bit digital video signal while referring to the output signal from the A/D converter 102 input to the signal processing circuit 103.

It is to be noted that the luminance signal Y, color difference signal B−Y and color difference signal R−Y that are contained in each of the digital video signals output from the signal processing circuits 103 and 106 have a sampling frequency ratio of 4:1:1 and are digital data signals each having an 8-bit amount of data. Each of the signal processing circuits 103 and 106 outputs a 12-bit digital video signal that consists of a combination of 8 bits of the luminance signal and the upper or lower order 4 bits of the color difference signal.

Accordingly, for example, the 8-bit color difference signal is formed by the upper order 4 bits of the color difference signal combined with 8 bits of the luminance signal and the lower order 4 bits of the color difference signal combined with the following 8 bits of the luminance signal. It is to be noted that the arrangement of the color difference signal will be later described using FIGS. 14A to 14D.

Although illustration has been made here of an example wherein the signal processing circuits 103 and 106 have been respectively separately provided in the (a) channel processing system and (b) channel processing system, no inconvenience occurs even when a construction is made up wherein the signal processing circuits 103 and 106 are provided as a single signal processing circuit and the 12-bit digital video signal is thereby output while referring to the signals processed in the respective opponent channel processing systems.

A reference symbol 107 represents an electronic zoom circuit that performs enlargement processing on the digital bideo signals output from the (a) and (b) channel processing systems according to the instruction made by the user. The above-described input digital video signal is taken into a frame memory 108 through the electronic zoom circuit 107 and, by necessary line data being sequentially read out from the frame memory 108, zoom processing is performed thereon in the electronic zoom circuit 107.

The video signal that has been processed in the electronic zoom circuit 107 is converted to a field signal by a frame/field converter circuit 109 and, after passing through a video process executing system not illustrated, is recorded in a digital video tape.

Figure 10:
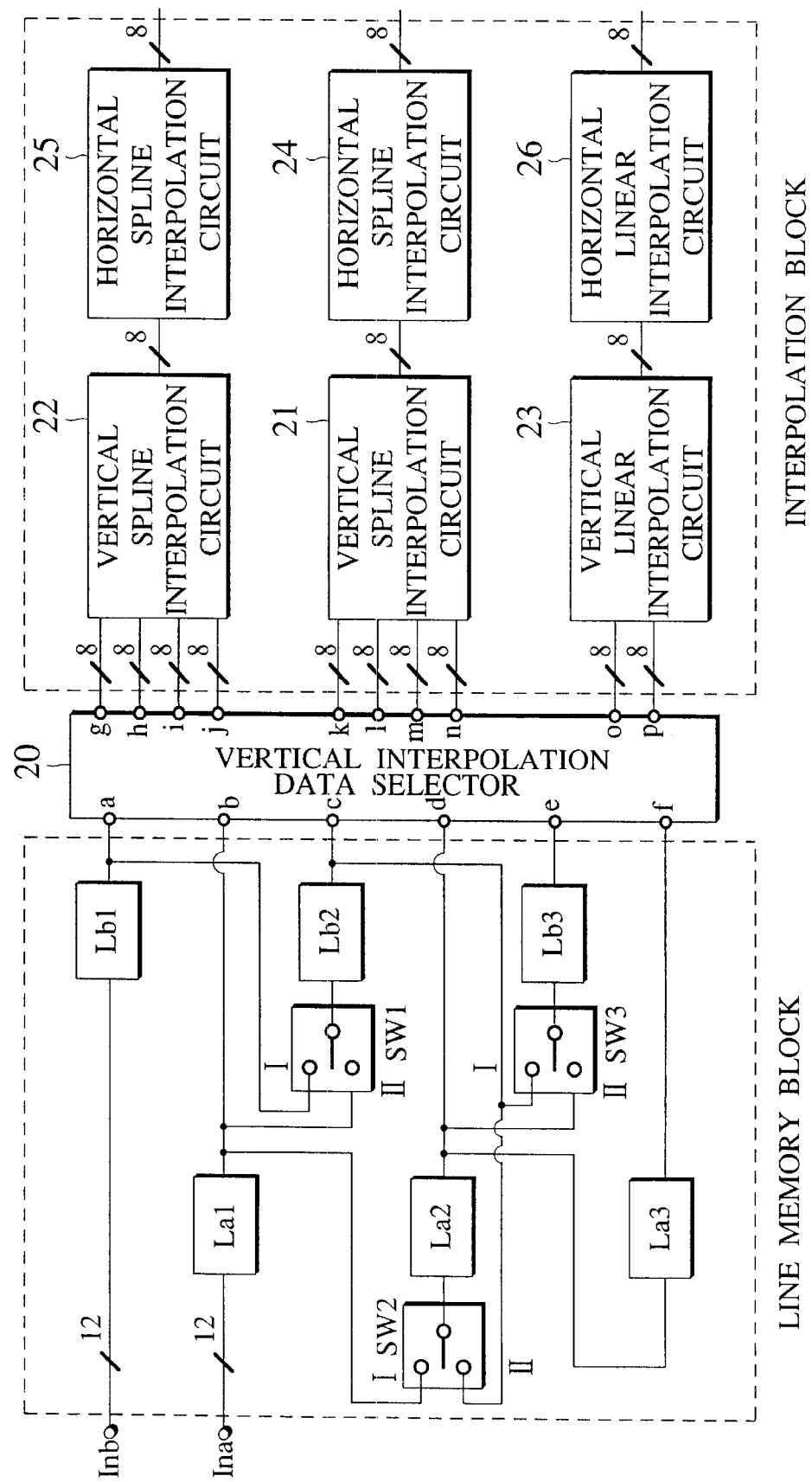
FIG. 10 is a block diagram illustrating an embodiment of the electronic zoom circuit according to the present invention.

FIG. 10 is a block diagram illustrating the electronic zoom circuit 107.

As illustrated in FIG. 10, the electronic zoom circuit 107 is constructed of input terminals Ina and Inb, line memory block, vertical interpolation data selector, and interpolation block. The line memory block is constructed of line memories La1, La2, La3, Lb1, Lb2, Lb3 and switches SW1 to SW3.

Here, to the input terminal Ina, the 12-bit video signal that has been processed in the (a) channel processing system is input from the frame memory 108, and, to the input terminal Inb, the 12-bit video signal that has been processed in the (b) channel processing system is input from the frame memory 108. Therefore, in each of the line memories La1, La2 and La3, there is stored 1-line data of the 12-bit video signal that has been processed in the (a) channel processing system, and, in each of the line memories Lb1, Lb2 and Lb3, there is stored 1-line data of the 12-bit video signal that has been processed in the (b) channel processing system.

Namely, each of the line memories La1, La2, La3, Lb1, Lb2 and Lb3 has stored therein a video signal corresponding to one line and outputs a signal that has been delayed by one horizontal scanning time period. Therefore, the video signals corresponding to three lines are taken out from the line memories La1 to La3 and the video signals corresponding to three lines are taken out from the line memories Lb1 to Lb3.

It is to be noted that each of the line memories La1 and Lb1 outputs only a part of the stored 1-line data thereof so that the video signal corresponding to a hatched portion of FIG. 11A may be enlarged horizontally by a horizontal interpolation circuit as later described and each of the line memories La2, La3, Lb2 and Lb3 outputs the signal input thereto by delaying it by one horizontal scanning time period so that the video signal corresponding to a hatched portion may be enlarged vertically by a vertical interpolation circuit as later described as illustrated in FIG. 11B.

The switch SW1 outputs selectively the video signals from the line memories Lb1 and La1 to the line memory Lb2, the switch SW2 outputs selectively the video signals from the line memories La1 and Lb2 to the line memory La2, and the switch SW3 outputs selectively the video signals from the line memories Lb2 and La2 to the line memory Lb3.

Here, when the input of each of the switches SW1 to SW3 is changed over to a terminal I side, 3-line line signals are obtained from the video signals input from each of the input terminals Ina and Inb, namely, 6-line line signals in total are obtained therefrom. When the input of each of the switches SW1 to SW3 is changed over to a terminal II side, 4-line line signals are obtained from the video signals input from the input terminal Ina.

To terminals (a) to (f) of the vertical interpolation data selector 20, there are input the video signals from the line memories Lb1, La1, Lb2, La2, Lb3 and La3, whereby there are selectively output only the data of the line signals needed to be used for electronic zoom processing as later described, of the 6-line video signals input thereto.

Accordingly, in a case where no variation in units of one horizontal scanning time period occurs on the line data needed to be used for electronic zoom processing, the line memories Lb2, La2, Lb3 and La3 perform no storing operation and continue to output the same line data.

An interpolation block is constructed of vertical spline interpolation circuits 21 and 22 for performing vertical zoom processing on the luminance signals, vertical linear interpolation circuit 23 for performing vertical zoom processing on the color difference signal, horizontal spline interpolation circuits 24 and 25 for performing horizontal zoom processing on the luminance signals, and horizontal linear interpolation circuit 26 for performing horizontal zoom processing on the color difference signal.

To the vertical spline interpolation circuit 21, there are input the 8-bit luminance signals corresponding to 4 adjacent line data of the (a) channel processing system and (b) channel processing system line data, from terminals (n), (m), (l) and (k) of the vertical interpolation data selector 20, whereby vertical spline interpolation processing is performed thereon.

To the vertical spline interpolation circuit 22, there are input the 8-bit luminance signals corresponding to 4 adjacent line data of the (a) channel processing system and (b) channel processing system line data, from terminals (j), (i), (h) and (g) of the vertical interpolation data selector 20, whereby vertical spline interpolation processing is performed thereon.

Further, to the vertical linear interpolation circuit 23, there are input the 8-bit color difference signals composed of the upper order bits and lower order bits in combination, which correspond to the 2 line data, from terminals (p) and (o) of the vertical interpolation data selector 20, whereby vertical linear interpolation processing is performed thereon. As a result, there are produced the line signals which have been processed by the (a) and (b) channel processing systems.

To the horizontal spline interpolation circuit 24, there is input the luminance signal with respect to which vertical interpolation processing has been completed, and horizontal interpolation processing is performed thereon and the resulting signal is output therefrom. To the horizontal spline interpolation circuit 25, there is input the luminance signal with respect to which vertical interpolation processing has been completed, and horizontal interpolation processing is performed thereon and the resulting signal is output therefrom.

Further, to the horizontal interpolation circuit 26, there is input the color difference signal with respect to which vertical interpolation processing has been completed, and horizontal interpolation processing is performed thereon and the resulting signal is output therefrom.

Next, the operation of the electronic zoom circuit 107 will be explained with reference to FIG. 10.

First, when electronic zoom processing is performed on the video signals picked up by the all-pixel readout CCD 100, the 12-bit digital video signals processed by the (a) channel processing system are input to the input terminal Ina and the 12-bit digital video signals processed by the (b) channel processing system are input to the input terminal Inb. In addition, the input of each of the switches SW1 and SW3 is changed over to the terminal I side.

The 12-bit digital video signals processed by the (a) channel processing system are input through the input terminal Ina and thus 1-line data is stored in the line memory La1.

As already explained in connection with FIG. 11A, the line memory La1 does not output the 1-line data as a whole but outputs slowly only a part of the 1-line data in correspondence with the zoom magnification throughout one horizontal scanning time period.

Here, since the input of the switch SW2 is changed over to the terminal I side, the line memory La1, switch SW2, line memory La2 and line memory La3 are connected to each other and form a path, whereby the signal from the line memory La1 is delayed by each line memory by the time length corresponding to one horizontal scanning time period and the resulting signals are input to the terminals (b), (d) and (f) of the vertical interpolation data selector 20.

On the other hand, the 12-bit digital video signals processed by the (b) channel processing system are input through the input terminal Inb, whereby 1-line data is stored first in the line memory Lb1.

Here, since the input of each of the switches SW1 and SW3 is changed over to the terminal I side, the line memory Lb1, switch SW1, line memory Lb2, switch SW3 and line memory Lb3 are connected to each other and form a path, whereby the signal from the line memory Lb1 is delayed by each line memory by the time length corresponding to one horizontal scanning time period and the resulting signals are input to the terminals (a), (c) and (e) of the vertical interpolation data selector 20.

FIG. 12 is a typical view illustrating the signals that are input to the terminals (a) to (f) of the vertical interpolation data selector 20. In this way, to the vertical interpolation data selector 20, there are input the video data corresponding to 3 successive even lines that have been processed by the (a) channel processing system and the video data corresponding to 3 successive odd lines that have been processed by the (b) channel processing system, namely, the line data corresponding to 6 successive lines in all.

The vertical interpolation data selector 20 selects 4 adjacent line data of the (a) and (b) channel systems from among these 6 successive line data as the data needed to be used for zoom processing.

Namely, the vertical interpolation data selector 20 outputs the 4-line data luminance signals input to, for example, the terminals (c) to (f) to the vertical spline interpolation circuit 21 through the terminals (k) to (n), and outputs the 4-line data luminance signals input to the terminals (b) to (e) to the vertical spline interpolation circuit 22 through the terminals (g) to (j).

It is to be noted that, at this time, to the spline interpolation circuits 21 and 22 there are output only the luminance signals each having a format of 8 bits.

The vertical interpolation data selector 20 outputs to the vertical linear interpolation circuit 23 the 2-line data which have been prepared by being suitably selected by excluding the first and last lines data from the 4-line data having been output to the spline interpolation circuit 21 or 22 from among those 6 successive line data.

Incidentally, at this time, to the vertical linear interpolation circuit 23, there are output only the color difference signals each having a format of 8 bits.

Here, an explanation will now be given of the vertical spline interpolation performed by the vertical spline interpolation circuits 21 and 22 and the vertical linear interpolation performed by the vertical linear interpolation circuit 23 with reference to FIGS. 13A to 13D. Note that FIGS. 13A to 13C are used for explanation of the vertical interpolation and FIG. 13D is used for explanation of the vertical linear interpolation.

Figure 13A:
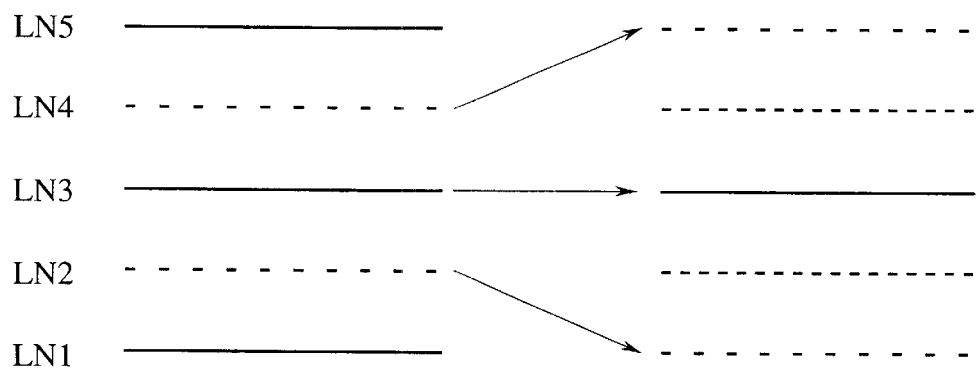
FIGS. 13A to 13D are typical views illustrating vertical spline interpolation and vertical linear interpolation.

FIG. 13A illustrates an example wherein the image data composed of 5 successive line data that consist of LN1 to LN5 line data has been vertically magnified to a twice larger size with the line data LN3 as the center.

In the vertical spline interpolation performed at this time, the value of luminance of each of the pixels constituting each line is referred to, data of the pixel interpolated based on the luminance values of 4 successive vertically arranged pixels is obtained, and this interpolation is sequentially performed with respect to each of the horizontally arranged pixels, thereby obtaining 1-line data.

Figure 13B:
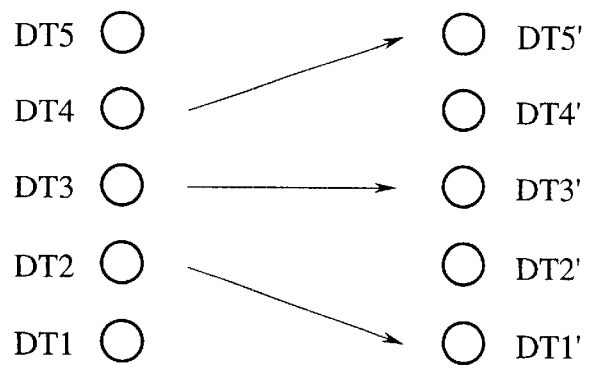
Figure 13C:
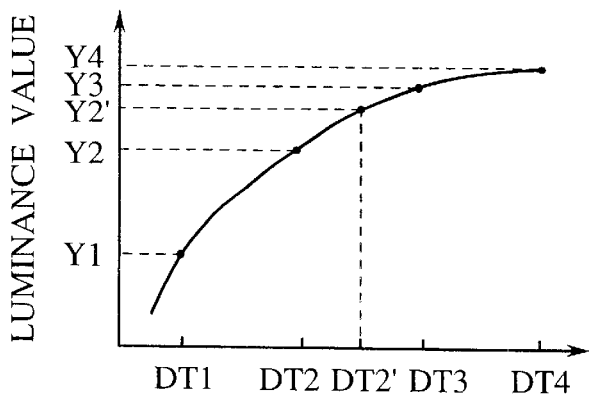
Figure 13D:
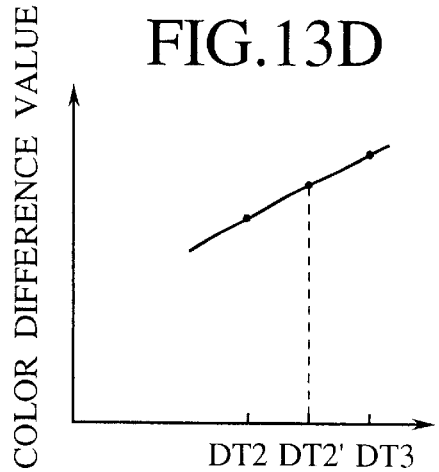

Assuming that the pixels on the line image data be represented by DT1 to DT5 and the pixels with respect to which enlargement processing has been already performed as a whole be represented by DT1' to D5', although as illustrated in FIG. 13B the luminance data of the DT1', DT3' and DT5' can be prepared using the luminance data of the DT2, DT3 and DT4, calculation becomes necessary regarding each of the luminance data of the DT2' and DT4'.

At this time, as illustrated in FIG. 13C, the luminance data Y2' of the DT2' is obtained from a curve that is obtained when having connected the luminance values Y1, Y2, Y3 and Y4 of the DT1, DT2, DT3 and DT4 in the form of a gentle curved line, and the luminance data Y4' of the DT4' is also similarly obtained from a curve that is obtained when having connected the luminance values Y2, Y3, Y4 and Y5 of the DT2, DT3, DT4 and DT5 in the form of a gentle curved line.

Namely, in the vertical spline interpolation performed at this time, the pixel data to be interpolated is obtained based on the luminance data of the 4 successive vertically arranged pixels which are the nearest to the pixel to be interpolated, line data that correspond to 4 successive lines become necessary.

On the other hand, when linear interpolation is performed, color difference data of the DT2' is obtained by connecting the color difference values of the DT2 and DT3 in the form of a straight line as illustrated in FIG. 13D. Namely, since the pixel data to be interpolated is obtained based on the color difference data arranged pixels nearest to the pixel to be interporated, line data of the two successive vertically corresponding to the two successive lines become necessary.

Also, although no detailed description in made here, regarding the horizontal spline interpolation and linear interpolation as well interpolation data are obtained in the same way as mentioned above.

It is to be noted that, here, vertical spline interpolation is performed on the luminance signal and vertical linear interpolation is performed on the color difference signal and therefore, as the signal obtained after the performance of the zoom processing, the interpolated data with respect to the color difference signal becomes inferior in zoom interpolation reproducibility to that with respect to the luminance signal. However, since the human eyes are not sensitive to the variation in the fineness of a color very much, the zoom image which is obtained becomes excellent.

In order to perform the spline interpolation and linear interpolation as explained above, the vertical interpolation data selector 20 selects line data necessary for the interpolation from among the 6-line line data input thereto. Further, it separates from each other the 8-bit luminance signal and 4-bit luminance signal of the 12-bit video signal and outputs the same.

Next, the separating operation for separating the luminance signal and color signal from each other through the vertical interpolation data selector 20 will be explained in detail with reference to FIGS. 14A to 14D.

It is assumed here that 12-bit video signals be input to each of the terminals (f), (e), (d), (c), and (b) of the vertical interpolation data selector 20 as illustrated in FIG. 14A. As explained already, to the terminals (f), (d) and (b) there are input the video signals that have been processed by the (a) channel processing system and, to the terminals (e) and (c), there are input the video signals that have been processed by the (b) channel processing system.

Each of the video signals which are input at this time is one which has been prepared by 8 bits of the luminance signal and the upper or lower order of 4 bits of the color difference signal being combined with each other by each of the signal processing circuits 103 and 106. It therefore is a 12-bit video signal as illustrated in FIG. 14A.

It is to be noted that, there, the luminance signal, color difference signal (B-Y) and color difference signal (R-Y) are represented by Y, B and R, respectively. The illustration made there shows that, for example, the first 12-bit image signal input from the terminal (b) is composed of 8 bits of the luminance signal corresponding to the pixel having a pixel number of 0 and the lower order of 4 bits of the color difference signal (B-Y) corresponding to the pixel having a pixel number of 0. The next 12-bit image signal is composed of 8 bits of the luminance signal corresponding to the pixel having a pixel number of 1 and the upper order of 4 bits of the color difference signal (B−Y) corresponding to the pixel having a pixel number of 0.

In a case where the vertical interpolation data selector 20 outputs to the vertical spline interpolation circuit 21 the line data input to its terminals (f), (e) (d) and (c) and outputs to the vertical spline interpolation circuit 22 the line data input to its terminals (e), (d), (c) and (b), the 8-bit luminance signals of the respective line video signals are sequentially selectively output from the terminals (n), (m), (l) and (k) to the vertical spline interpolation circuit 21 as illustrated in FIG. 14B while, on the other hand, the 8-bit luminance signal of the respective line video signals are sequentially selectively output from the terminals (j), (i), (h) and (g) to the vertical spline interpolation circuit 22 as illustrated in FIG. 14C.

FIG. 14D illustrates the output signals that are output to the vertical linear interpolation circuit 23 at this time. The vertical interpolation data selector 20 combines the lower order of 4 bits and upper order of 4 bits of each of the respective the line color difference signals input from the terminals (a), (b), (c), (d), (e) and (f) thereof and forms 8-bit color difference signals, whereby there are alternately output from the terminals (p) and (o) on a basis of time series the color difference signal needed to be used for the zoom processing corresponding to the (a) channel processing system and the color difference signal needed to be used for the zoom processing corresponding to the (b) channel processing system. Here, the first 8-bit signal that is output from each of the terminals (p) and (o) represents a color difference signal necessary for the zoom processing corresponding to the (a) channel processing system and the next 8-bit signal represents a color difference signal necessary for the zoom processing corresponding to the (b) channel processing system.

Accordingly, from the terminals (p) and (o), there are sequentially output the 2-line signals prepared by excluding the first and last line signals from the 4-line signals that are input from the terminals (f), (e), (d) and (c) thereof, namely, here, the 2-line color difference signals (B−Y) (Be0 and Bd0) that are input from the terminals (e) and (d), next, the 2-line signals prepared by excluding the first and last line signals from the 4-line signals that are input from the terminals (e), (d), (c) and (b) thereof, namely, here, the 2-lien color difference signals (B−Y) (Bd0 and Bc0) that are input from the terminals (d) and (c), next, the 2-line color difference signals (R−Y) (Re0 and Rd0) that are input from the terminals (e) and (d), and then the 2-line color difference signals (R−Y) (Rd0 and Rc0) that are input from the terminals (d) and (c).

It is to be noted that although there is a case where the line data corresponding to different lines are selectively output to the vertical spline interpolation circuits 21 and 22 as explained above, there is also a case where the 4-line line data whose 4 lines are the same are selected and output to the vertical spline interpolation circuits 21 and 22 according to the zoom magnification instructed by the user.

Next, the zoom processing that is performed on the video signal that has been reproduced from the digital video tape will be explained.

The video signal that is reproduced from the digital video tape is a 12-bit video signal composed of an 8-bit luminance signal and a 4-bit color difference signal, whereby the signal form thereof is the same as the video signal which has been processed by the (a) and (b) channel processing systems.

When zoom processing is performed on the video signal reproduced from the digital video tape, a switch(not shown) which is provided in a stage preceding the input terminal Ina illustrated in FIG. 10 changes over the input thereof to input the reproduction signal from the digital video tape, with the result what the 12-bit video signal composed of 8-bit luminance signal and 4-bit color difference signal is input to the input terminal Ina. It is to be noted that the video signal reproduced from the digital video tape is not input to the terminal Inb.

At this time, the inputs of the switches SW1 to SW3 are each changed over to the terminal II side, whereby the line memory La1, switch SW1, line memory Lb2, switch SW2, line memory La2, switch SW3 and line memory Lb3 are electrically connected to each other and form an electric path.

The 1-line video signal that is input from the input terminal Ina is stored in the line memory La1. As explained already, the line memory La1 does not output the 1-line data as a whole and outputs slowly only a part of the 1-line data according to the zoom magnification throughout one horizontal scanning time period.

As a result, the video signal is delayed in each line memory by the time length corresponding to one horizontal scanning line, whereby the video signals corresponding to 4 successive line data are input to the terminals (e), (d), (c) and (b) of the vertical interpolation data selection 20.

Accordingly, the vertical interpolation data selection 20 extracts only the 8-bit luminance signal alone from each of the 4-line video signals input thereto and outputs it to at least one of the vertical interpolation circuits 21 and 22. Further, it extracts only the 4-bit color difference signal alone from each of the 2-line video signals that the prepared by excluding the first and last line video signals from the 4-line video signals input thereto, namely, hare, the 2-line video signals input from the terminals (d) and (c), and combines together the lower and upper order bits constituting the respective 4-bit color difference signals to thereby form 8-bit color difference signals, and outputs them to the vertical linear interpolation circuit 23.

Then, as explained already, after similar interpolation processing has been performed thereon by the vertical spline interpolation circuit 21 or 22, vertical linear interpolation circuit 23, horizontal spline interpolation circuit 24 or 25 and horizontal linear interpolation circuit 26, the resulting signals are output to the frame/field converter circuit 109.

In a case where reproducing from the digital video tape the static image recorded in a progressive mode for processing by the (a) and (b) channel processing systems the video signals that are output from the all-pixel readout CCD 100 with the same timing to thereby form a 1-frame static image by the use of the video signals having been processed by the both channels and record it into the digital video tape, electronic zoom processing can be performed by inputting 2-field reproduction video signals to the input terminals Ina and Inb of FIG. 10 with the same timing and performing the same processing as in the case of the zoom processing done with respect to the video signal from the all-pixel readout CCD 100.

As has been explained above, since the electronic zoom circuit according to the present invention performs zoom processing on the basis of both the even-line line data and the odd-line line data that are output from the all-pixel readout type solid image pickup element, it is possible to obtain a high quality of zoomed video images.

Also, since the vertical interpolation data selection 20 combines together the upper order 4 bits and lower order 4 bits of each color difference signal input thereto and outputs them in the form of an 8-bit color difference signal, it is possible to enhance the zoom precision by the use of the two systems of 4-bit data signals.

It should be understood that many modifications and adaptations of the invention will become apparent to those skilled in the art and it is intended to encompass such obvious modifications and changes in the scope of the claims appended hereto.

What is claimed is:

1. An image output apparatus, comprising:
   image output means having an output mode in which first and second image data forming one image data are addition processed in a ratio of $\alpha:\beta$ other than the ratio therebetween whose value is 1 to thereby form first output image data whose amount is the same as that of the first or second image data, the first output image data being output therefrom; and a first and second image data are addition processed in an inverted ratio of $\beta:\alpha$ from the ratio therebetween that has been used when addition processing has been performed in order to form the first output image data to thereby form second output image data whose amount is the same as that of the first or second image data, the second output image data being output therefrom.

2. An image output apparatus according to claim 1, wherein, assuming that the whole amount of data of each of the first and second image data be "1", the image output means addition processes a quarter of the first image data and three quarters of the second image data to thereby form the first output image data and addition processes three quarters of the first image data and a quarter of the second image data to thereby form the second output image data.

3. An image output apparatus according to claim 1, wherein the image output means further has an output mode in which the first and second image data forming the one image data are addition processed in a ratio of 1:1 to thereby form the first and second output image data and output the same.

4. An image output apparatus according to claim 1, wherein the image output means further has an output mode in which the first and second image data forming the one image data are output as the first and second output image data as are without being addition processed.

5. An image output -apparatus according to claim 3, wherein the image output means forms the first and second output image data in correspondence with the output mode corresponding to forming conditions that are applied when forming the first and the second image data and outputs the first and second output image data.

6. An image output apparatus according to claim 3, wherein the image output means forms the first and second output image data in correspondence with the output mode corresponding to a difference in level between the first and second image data and outputs the first and second output image data.

7. An image output apparatus according to claim 3, further comprising output mode selecting means for selecting a desired output mode and wherein the image output means forms the first and second output image data in correspondence with an output mode selected by the output mode selecting means and outputs the first and second output image data.

8. An image output apparatus according to claim 1, wherein the image output means forms and outputs the first and second output image data by using the one image data as 1-frame image data and using the first and second image data, respectively, as 1-field image data.

9. An image output method, comprising the steps of addition processing first and second image data forming one image data in a ratio of $\alpha:\beta$ other than the ratio therebetween whose value is 1 to thereby form first output image data whose amount is the same as that of the first or second image data and output the same, and addition processing the first and second image data in an inverted ratio of $\beta:\alpha$ from the ratio therebetween that has been used when addition processing has been performed in order to form the first output image data to thereby form second output image data whose amount is the same as that of the first or second image data and output the same.

10. An image pickup apparatus, comprising:
    image pickup means for imaging an object and outputting image pickup data; and
    image output means having an output mode in which first and second image data supplied from the image pickup means as image data forming one image data by two image data are addition processed in a ratio of $\alpha:\beta$ other than the ratio therebetween whose value is 1 to thereby form first output image data whose amount is the same as that of the first or second image data, the first output image data being output therefrom; and the first and second image data are addition processed in an inverted ratio of $\beta:\alpha$ from the ratio therebetween that has been used when addition processing has been performed in order to form the first output image data to thereby form second output image data whose amount is the same as that of the first or second image data, the second output image data being output therefrom.

11. An image pickup apparatus according to claim 10, wherein, assuming that the whole amount of data of each of the first and second image data be "1", the image output means addition processes quarter of the first image data and three quarters of the second image data to thereby form the first output image data and addition processes three quarters of the first image data and a quarter of the second image data to thereby form the second output image data.

12. An image pickup apparatus according to claim 10, wherein the image output means further has an output mode in which the first and second image data forming the one image data are addition processed in a ratio of 1:1 to thereby form the first and second output image data and output the same.

13. An image pickup apparatus according to claim 10, wherein the image output means further has an output mode in which the first and second image data forming the one image data are output as the first and second output image data as are without being addition processed.

14. An image pickup apparatus according to claim 12, wherein the image output means forms the first and second output image data in correspondence with the output mode corresponding to the image pickup mode that is applied when forming the first and second image data and outputs the first and second output image data.

15. An image pickup apparatus according to claim 12, wherein the image pickup means is so arranged as to image the object by solid image pickup means; and the image output means forms the first and second output image data in correspondence with the output mode corresponding to a difference in level between the first and second image data and outputs the first and second output image data.

16. An image pickup apparatus according to claim 12, further comprising an output mode selecting means for selecting a desired output mode and wherein the image output means forms the first and second output image data in correspondence with an output mode selected by the output mode selecting means and outputs the first and second output image data.

17. An image pickup apparatus according to claim 10, wherein the image output means forms and outputs the first and second output image data by using the one image data as 1-frame image data and using the first and second image data, respectively, as 1-field image data.

18. An image pickup method, comprising:

the step of imaging an object by image pickup means and thereby outputting first and second image data from the image pickup means as image data forming one image data by the first and second image data; and the step of addition processing the first and second image data obtained by execution of the preceding step in a ratio of $\alpha:\beta$ other than the ratio therebetween whose value is 1 to thereby form first output image data whose amount is the same as that of the first or second image data and output the same, and addition processing the first and second image data in an inverted ratio of $\beta:\alpha$ from the ratio therebetween that has been used when addition processing has been performed in order to form the first output image data to thereby form second output image data whose amount is the same as that of the first or second image data and output the same.

19. A storage medium having stored therein an image output program comprising the steps of addition processing first and second image data forming one image data in a ratio of $\alpha:\beta$ other than the ratio therebetween whose value is 1 to thereby form first output image data whose amount is the same as that of the first or second image data and output the same, and addition processing the first and second image data in an inverted ratio of $\beta:\alpha$ from the ratio therebetween that has been used when addition processing has been performed in order to form the first output image data to thereby form second output image data whose amount is the same as that of the first or second image data and output the same.

* * * * *